(12) United States Patent
Belleschi et al.

(10) Patent No.: US 11,290,213 B2
(45) Date of Patent: Mar. 29, 2022

(54) COMMAND RECEIPT CONFIRMATION IN A WIRELESS COMMUNICATION SYSTEM

(71) Applicant: Telefonaktiebolaget LM Ericsson (publ), Stockholm (SE)

(72) Inventors: Marco Belleschi, Solna (SE); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 103 days.

(21) Appl. No.: 16/637,303

(22) PCT Filed: Aug. 9, 2018

(86) PCT No.: PCT/SE2018/050804
§ 371 (c)(1),
(2) Date: Feb. 7, 2020

(87) PCT Pub. No.: WO2019/032028
PCT Pub. Date: Feb. 14, 2019

(65) Prior Publication Data
US 2020/0235861 A1  Jul. 23, 2020

Related U.S. Application Data

(60) Provisional application No. 62/544,758, filed on Aug. 11, 2017.

(51) Int. Cl.
*H04L 1/16* (2006.01)
*H04W 72/04* (2009.01)
(52) U.S. Cl.
CPC ......... *H04L 1/1614* (2013.01); *H04W 72/042* (2013.01)

(58) Field of Classification Search
CPC .............. H04L 1/1614; H04W 72/042; H04W 52/146; H04W 56/00; H04W 88/02
See application file for complete search history.

(56) References Cited

U.S. PATENT DOCUMENTS

2017/0187835 A1* 6/2017 Lim .................... H04L 43/0805

FOREIGN PATENT DOCUMENTS

WO    2018174770 A1    9/2018

OTHER PUBLICATIONS

"Introducing Sidelink SPS in MAC" 3GPP TSG-RAN WG2 #97; R2-1700925, Athens, Greece, Feb. 13-17, 2017, pp. 1-16 (Year: 2017).*

(Continued)

*Primary Examiner* — Jamal Javaid
(74) *Attorney, Agent, or Firm* — Sage Patent Group

(57) ABSTRACT

A user equipment (18) is configured for use in a wireless communication system (10). The user equipment (18) is configured to receive from radio network equipment (24) a command (32) with respect to an operating configuration (20). The operating configuration (20) specifies a set of transmission parameters for communication. The user equipment (18) is also configured to confirm receipt of the command (32) by setting the value of a confirmation field (36) in a message (34) and transmitting the message (34). In some embodiments, the confirmation field (36) is shared for confirming receipt of a number of different types of commands with respect to the operating configuration (20) that is greater than a number of possible values of the confirmation field (36).

20 Claims, 23 Drawing Sheets

(56) References Cited

OTHER PUBLICATIONS

Unknown, Author, "Introducing Sidelink SPS in MAC", 3GPP TSG-RAN WG2 #97; R2-1700925; Athens, Greece, Feb. 13-17, 2017, pp. 1-16.
Unknown, Author, "On AUL Confirmation", 3GPP TSG-RAN WG2 #102; TDoc R2-1808143; Busan, Republic of Korea, May 21-25, 2018, pp. 1-3.
Unknown, Author, "SPS confirmation for V2X", 3GPP TSG-RAN WG2 #98; Tdoc R2-1705541; Hangzhou, China, May 15-19, 2017, pp. 1-5.

* cited by examiner

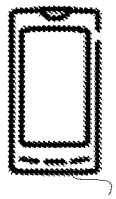

18

RECEIVE FROM RADIO NETWORK EQUIPMENT A COMMAND TO ACTIVATE OR RELEASE AN OPERATING CONFIGURATION, THE OPERATING CONFIGURATION SPECIFYING A SET OF TRANSMISSION PARAMETERS FOR COMMUNICATION
130

CONFIRM RECEIPT OF THE COMMAND BY SETTING THE VALUE OF A CONFIRMATION FIELD IN A MESSAGE TO BE DIFFERENT THAN A DEFAULT VALUE FOR THE CONFIRMATION FIELD AND TRANSMITTING THE MESSAGE
140

*FIGURE 7B*

18

RECEIVE FROM RADIO NETWORK EQUIPMENT A COMMAND WITH RESPECT TO AN OPERATING CONFIGURATION, THE OPERATING CONFIGURATION SPECIFYING A SET OF TRANSMISSION PARAMETERS FOR COMMUNICATION
150

CONFIRM RECEIPT OF THE COMMAND BY SETTING THE VALUE OF A CONFIRMATION FIELD IN A MESSAGE AND TRANSMITTING THE MESSAGE, WHEREIN THE CONFIRMATION FIELD IS SHARED FOR CONFIRMING RECEIPT OF A NUMBER OF DIFFERENT TYPES OF COMMANDS (OR ACTIVATION STATUSES) WITH RESPECT TO THE OPERATING CONFIGURATION THAT IS GREATER THAN A NUMBER OF POSSIBLE VALUES OF THE CONFIRMATION FIELD
160

*FIGURE 7C*

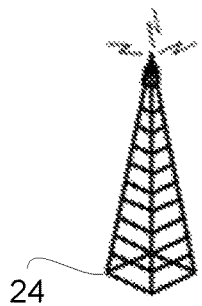

24

TRANSMIT TO THE USER EQUIPMENT A COMMAND WITH RESPECT TO AN OPERATING CONFIGURATION, THE OPERATING CONFIGURATION SPECIFYING A SET OF TRANSMISSION PARAMETERS FOR COMMUNICATION
238

AFTER TRANSMITTING THE COMMAND, RECEIVE A MESSAGE WITH THE CONFIRMATION FIELD
240

DETERMINE WHETHER THE MESSAGE CONFIRMS RECEIPT OF THE COMMAND BASED ON A VALUE OF THE CONFIRMATION FIELD, WHEREIN THE CONFIRMATION FIELD IS SHARED FOR CONFIRMING RECEIPT OF A NUMBER OF DIFFERENT TYPES OF COMMANDS (OR ACTIVATION STATUSES) WITH RESPECT TO THE OPERATING CONFIGURATION THAT IS GREATER THAN A NUMBER OF POSSIBLE VALUES OF THE CONFIRMATION FIELD
242

*FIGURE 8C*

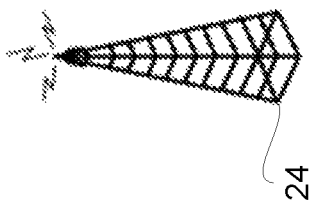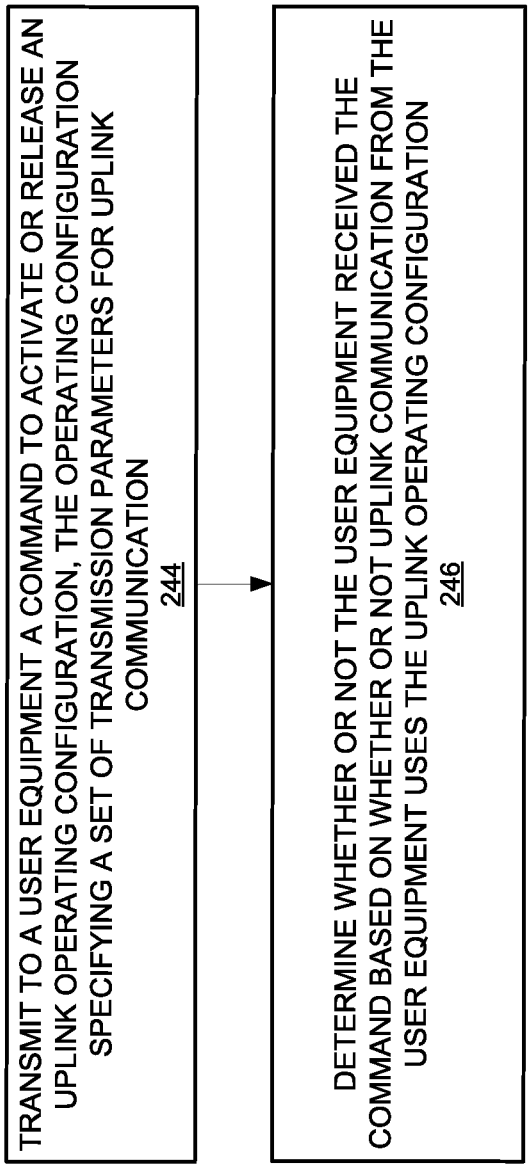

COMMAND RECEIPT CONFIRMATION IN A WIRELESS COMMUNICATION SYSTEM

TECHNICAL FIELD

The present application relates generally to a wireless communication system, and relates more particularly to confirming receipt of a command in a wireless communication system.

BACKGROUND

In Long Term Evolution (LTE), since the $3^{rd}$ Generation Partnership Project (3GPP) Release 8 and before 3GPP Release14, the eNodeB (eNB) can configure at most one semi persistent scheduling (SPS) configuration to a certain user equipment (UE) in the uplink (UL) and another one in the downlink (DL). The eNB can (re)activate and release such SPS configuration via the physical downlink control channel (PDCCH). More specifically, once the UE is configured with SPS, it shall monitor the PDCCH with a cyclic redundancy check (CRC) scrambled with a specific SPS cell radio network temporary identifier (C-RNTI) and check whether PDCCH contains activation/release commands for the SPS configuration. The activation command contains an SPS grant with the set of SPS resources the UE should start using, while the release command is indicated by an empty SPS grant (i.e. modulation and coding scheme (MCS) and physical resource blocks (PRBs) bits set to all '1's).

If an SPS (re)activation command is received, the SPS configuration is activated and the UE can use a set of physical resources (as indicated by PDCCH) which are spaced by a certain time interval (as indicated in the SPS configuration). If an SPS release command is received, the UE stops using the associated resources.

In 3GPP Release 14, the UE may be allowed to skip the UL grant, in case the hybrid automatic repeat request (HARQ) buffer is empty. This avoids the UE sending just padding, thereby limiting the UL interference and battery consumption. Before Release 14, the eNB could realize whether an activation/release command was correctly received by simply monitoring the UL transmission at the first SPS occasion. However, if the UE skips exploiting the SPS UL grant for some time, the eNB cannot realize whether the SPS activation/release command has been really received or not.

For this reason, an SPS confirmation signal has been introduced. Such SPS confirmation should be triggered upon reception of an activation/release command on PDCCH, e.g., by UEs that are capable of skipping the UL grant. However, configuring the SPS confirmation signal to convey confirmations efficiently proves challenging under some contexts that expand configuration flexibility or capabilities, such as when multiple types and/or numbers of SPS configurations can be activated.

SUMMARY

Embodiments herein include a method performed by a user equipment configured for use in a wireless communication system. The method comprises receiving from radio network equipment a command with respect to an operating configuration. The operating configuration specifies a set of transmission parameters for communication. The method also comprises confirming receipt of the command by setting the value of a confirmation field in a message and transmitting the message. The confirmation field in some embodiments is shared for confirming receipt of a number of different types of commands with respect to the operating configuration that is greater than a number of possible values of the confirmation field.

In some embodiments, for example, the command is either a first possible type which commands that a released operating configuration be activated, a second possible type which commands that an activated operating configuration be released, or a third possible type which commands that an activated operating configuration be re-activated with one or more different parameters. In this case, the confirmation field may be shared for confirming receipt of any of the first, second, and third types of commands.

In some embodiments, the confirmation field is a single bit field, such that the possible values of the confirmation field include a possible value of 1 and a possible value of 0.

In some embodiments, the confirmation field is specific to a certain cell.

In some embodiments, the confirmation field is shared for confirming receipt of any command to activate, release, or re-activate any of multiple operating configurations in a certain cell.

In some embodiments, the confirmation field is shared for confirming receipt of any command to activate, release, or re-activate an operating configuration with a certain configuration index in any of multiple cells.

In some embodiments, different possible values of the confirmation field are decoupled from the different possible types of commands, such that a certain value of the confirmation field does not confirm receipt of a certain type of command.

In some embodiments, different possible values of the confirmation field are decoupled from an activation status of the operating configuration, such that a certain value of the confirmation field does not indicate a certain activation status of the operating configuration.

In some embodiments, setting the value of the confirmation field comprises setting the value of the confirmation field to be different than a default value for the confirmation field.

In some embodiments, a value of the confirmation field that is different than a default value for the confirmation field confirms receipt of the command, and the default value for the confirmation field does not confirm receipt of the command.

In some embodiments, the operating configuration is a semi-persistent scheduling (SPS) configuration that specifies a set of periodic radio resources for communication.

Embodiments herein also include a method performed by radio network equipment configured for use in a wireless communication system. The method comprises transmitting to a user equipment a command to with respect to an operating configuration. The operating configuration specifies a set of transmission parameters for communication. The method also comprises, after transmitting the command, receiving a message with a confirmation field. The method further includes determining whether the message confirms receipt of the command based on the value of the confirmation field. The confirmation field in some embodiments is shared for confirming receipt of a number of different types of commands with respect to the operating configuration that is greater than a number of possible values of the confirmation field. In some embodiments, the command is either a first possible type which commands that a released operating configuration be activated, a second possible type which commands that an activated operating configuration be released, or a third possible type which commands that an activated operating configuration be re-activated with one or more different parameters. In this case, the confirmation field may be shared for confirming receipt of any of the first, second, and third types of commands.

In some embodiments, the confirmation field is a single bit field, such that the possible values of the confirmation field include a possible value of 1 and a possible value of 0.

In some embodiments, the confirmation field is specific to a certain cell.

In some embodiments, the confirmation field is shared for confirming receipt of any command to activate or release any of multiple operating configurations in a certain cell.

In some embodiments, the confirmation field is shared for confirming receipt of any command to activate, release, or re-activate an operating configuration with a certain configuration index in any of multiple cells.

In some embodiments, different possible values of the confirmation field are decoupled from the different possible types of commands, such that a certain value of the confirmation field does not confirm receipt of a certain type of command.

In some embodiments, different possible values of the confirmation field are decoupled from an activation status of the operating configuration, such that a certain value of the confirmation field does not indicate a certain activation status of the operating configuration. In some embodiments, determining whether the message confirms receipt of the command based on a value of the confirmation field comprises determining whether the value of the confirmation field is different than a default value for the confirmation field.

In some embodiments, determining whether the message confirms receipt of the command based on the value of the confirmation field comprises determining that the message confirms or does not confirm receipt of the command depending respectively on whether the value of the confirmation field is or is not different than a default value for the confirmation field.

In some embodiments, the operating configuration is a semi-persistent scheduling (SPS) configuration that specifies a set of periodic radio resources for communication.

Embodiments further include corresponding apparatus, computer programs, and carriers such as non-transitory computer readable medium.

For example, embodiments include a user equipment configured for use in a wireless communication system. The user equipment is configured to receive from radio network equipment a command with respect to an operating configuration. The operating configuration specifies a set of transmission parameters for communication. The user equipment is also configured to confirm receipt of the command by setting the value of a confirmation field in a message and transmitting the message. In some embodiments, the confirmation field is shared for confirming receipt of a number of different types of commands with respect to the operating configuration that is greater than a number of possible values of the confirmation field.

Embodiments also include radio network equipment configured for use in a wireless communication system. The radio network equipment is configured to transmit to a user equipment a command with respect to an operating configuration. The operating configuration specifies a set of transmission parameters for communication. The radio network equipment is further configured to, after transmitting the command, receive a message with a confirmation field. The radio network equipment is also configured to determine whether the message confirms receipt of the command based on the value of the confirmation field. The confirmation field in some embodiments is shared for confirming receipt of a number of different types of commands with respect to the operating configuration that is greater than a number of possible values of the confirmation field.

Other embodiments herein include a method performed by a user equipment configured for use in a wireless communication system. The method may comprise receiving from radio network equipment a command to activate or release an operating configuration, the operating configuration specifying a set of transmission parameters for communication. The method may also comprise confirming receipt of the command by setting the value of a confirmation field in a message to be different than a stored value for the confirmation field and transmitting the message.

Embodiments herein also include a method performed by radio network equipment configured for use in a wireless communication system. The method may comprise transmitting to a user equipment a command to activate or release an operating configuration, the operating configuration specifying a set of transmission parameters for communication. The method may further comprise, after transmitting the command, receiving a message with a confirmation field. The method may then comprise determining whether the message confirms receipt of the command based on whether a value of the confirmation field is different than a stored value for the confirmation.

Still other embodiments herein include a method performed by radio network equipment configured for use in a wireless communication system. The method comprises transmitting to a user equipment a command to activate or release an uplink operating configuration, the operating configuration specifying a set of transmission parameters for uplink communication. The method may also comprise determining whether or not the user equipment received the command based on whether or not uplink communication from the user equipment uses the uplink operating configuration.

Embodiments further include corresponding apparatus, computer programs, and carriers such as non-transitory computer readable medium.

More specifically, some embodiments herein include methods to efficiently deliver an SPS confirmation in case of multiple SPS configurations configured to the UE, possibly in different carriers. For example, some embodiments include different methods to report SPS confirmation MAC CE to confirm to the eNB that the UE has received multiple SPS (re)activation/release commands on multiple cells.

Some embodiments prove advantageous in that a UE can deliver a single SPS confirmation MAC CE which contains the activation/release status of multiple SPS configurations. Alternatively or additionally, unlike other SPS confirmation methods, some methods herein alleviates latency, resource wastage and battery consumption of the UE.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a block diagram of a message for command confirmation for semi-persistent scheduling (SPS) in the form of a medium access control (MAC) control element (CE) according to some embodiments.

FIG. 5 is a block diagram of a message for command confirmation for semi-persistent scheduling (SPS) in the form of a medium access control (MAC) control element (CE) according to other embodiments.

FIG. 7B is a logic flow diagram of a method performed by a user equipment according to other embodiments.

FIG. 7C is a logic flow diagram of a method performed by a user equipment according to yet other embodiments.

FIG. 8C is a logic flow diagram of a method performed by radio network equipment according to yet other embodiments.

FIG. 8D is a logic flow diagram of a method performed by radio network equipment according to still other embodiments.

DETAILED DESCRIPTION

Figure 1:
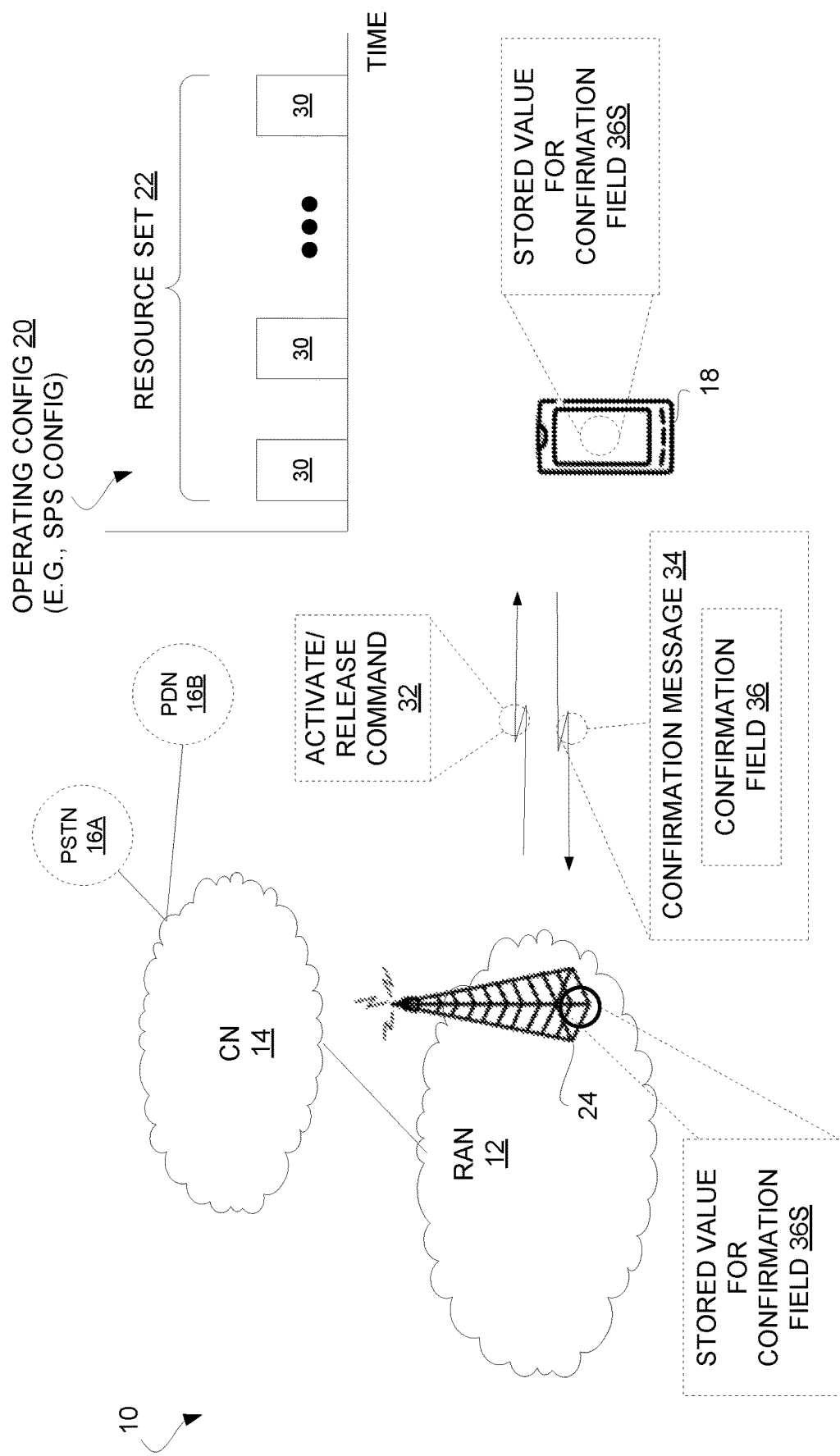
FIG. 1 is a block diagram of a wireless communication system according to some embodiments.

FIG. 1 illustrates a wireless communication system 10 according to some embodiments. As shown, the system 10 includes network infrastructure in the form of a radio access network (RAN) 12 and a core network (CN) 14 (e.g., operating according to Long Term Evolution, LTE, technology or 5G technology). The RAN 12 provides radio access to the CN 14, which may in turn provide connectivity to one or more external networks 16A, 16B. As shown, these external network(s) 16A, 16B include a public switched telephone network (PSTN) 16A and a packet data network (PDN) 16B, such as the Internet.

FIG. 1 also shows a user equipment (UE) 18 in the system 10 according to some embodiments. UE 18 in some embodiments is associated with a vehicles (e.g., a car, truck, bus, or the like) and may therefore be appropriately referred to as vehicular UE 18. UE 18 may for instance characterize the vehicles as a whole, may characterize components integrally installed or formed in the vehicles (e.g., in the vehicles' dashboard), and/or may characterize radio terminals communicatively connected to the vehicles (e.g., via Bluetooth). In other embodiments, though, UE 18 by contrast may not be so associated with a vehicle. UE 18 may for instance be carried by a pedestrian. The UE 18 may still be a different kind of UE, such as for instance a UE associated with stationary traffic infrastructure (e.g., a traffic sign).

No matter the type of UE 18, though, UE 18 may support communication with the network infrastructure, e.g., on a downlink (DL) and/or an uplink (UL) channel. Such communication may involve for instance communication with radio network equipment 24 (shown in FIG. 1 as a base station or enhanced Node B, eNB) in the RAN 12, e.g., via LTE or 5G radio access. The UE 18 may additionally or alternatively support device-to-device communication, so as to support direct communication between the UE 18 and another UE, e.g., on a sidelink (SL) channel.

UE 18 for example may be configured for vehicle-to-everything (V2X) communication. Configured in this way, the UE 18 may be configured to directly communicate with another UE via vehicle-to-vehicle (V2V) communication, directly communicate with another UE 22 vehicle-to-pedestrian (V2P) communication, and/or communicate with radio network equipment 24 via vehicle-to-infrastructure (V21) communication.

In some embodiments, the network infrastructure controls or otherwise governs the set of transmission parameters that the UE 18 uses for communication. These transmission parameters may include for instance modulation and coding scheme (MCS), power, radio resources (e.g., time and/or frequency resources), etc. One approach for such control would be for the network infrastructure to dynamically allocate the set of transmission parameters (e.g., radio resources) to the UE 18 for communication. In this case, the UE 18 would need to receive a dynamic resource allocation that allocates the set of transmission parameters (e.g., grants certain radio resources) in order for the UE 18 to communicate with those parameters.

To reduce control channel overhead, though, the network infrastructure may alternatively or additionally define one or more operating configurations, with each operating configuration specifying a set of transmission parameters for communication. Such configurations may be statically defined or semi-statically defined. With the configuration(s) defined, the network infrastructure 24 may command the UE 18 to activate or release a certain operating configuration so as to effectively control the set of transmission parameters that the UE 18 uses for communication. Moreover, this activation or release of the operating configuration may persist for some time such as until release, e.g., as opposed to a dynamic allocation that is not persistent.

As an example, consider radio resources that the UE 18 uses for communication. The network infrastructure may dynamically allocate radio resources (e.g., time-frequency resources) to UE 18 for communication, by transmitting dynamic resource grants on a control channel to the UE 18. In this case, the UE 18 must receive a dynamic resource grant that grants a certain radio resource in order for the UE 18 to communicate on that resource. To reduce control channel overhead, though, the network infrastructure may alternatively or additionally use semi-persistent scheduling (SPS). With SPS, the UE 18 may be granted a semi-persistent allocation of radio resources for communication, i.e., a resource grant may persist for some time, as opposed to dynamic scheduling which may utilize one-time resource grants.

In any event, FIG. 1 shows an operating configuration 20. The operating configuration 20 may for instance be an SPS configuration that specifies a set 22 of periodic resources 30 (e.g., time-frequency resources) that the UE 18 may use for communication. The UE 18 may use those resources for communication even if the UE 18 does not receive a dynamic resource grant for those resources. That said, the semi-persistent nature of the SPS configuration manifests itself in that the SPS configuration may be activated or released, as commanded by the network infrastructure 24 controlling radio resource usage. When the SPS configuration is active, the periodic resources specified by the configuration may be used for communication. But when the SPS configuration is released, the periodic resources may not be used for communication, e.g., the network infrastructure may reallocate those resources.

No matter the particular type of the operating configuration 20, though, FIG. 1 shows that radio network equipment 24 may transmit to the UE 18 a command 32 to activate or release the operating configuration 20. The command 32 may be transmitted for instance as downlink control information (DCI), e.g., using DCI format 0 scrambled by a radio network temporary identity (RNTI) for the UE 18. Regardless, the radio network equipment 24 and the UE 18 may be configured to activate or release the operating configuration 20 in accordance with the command 32. When the operating configuration 20 is activated by the command 32, for instance, the radio network equipment 24 and the UE 18 may transmit or receive communication using the set of transmission parameters (e.g., on the set 22 of periodic resources 30 specified by the operating configuration 20 in embodiments where the configuration is an SPS configuration). When the operating configuration 20 is released by the command 32, though, the radio network equipment 24 and the UE 18 may cease transmitting or receiving communication using the set of transmission parameters.

Challenges may exist though if the network and the UE 18 are not synchronized in terms of the active or released state of the operating configuration 18. Consider for instance embodiments where the operating configuration 18 is an SPS configuration that specifies a set of radio resources for communication. If the radio network equipment 24 does not receive confirmation that the UE 18 received a release command, the radio network equipment 24 may defer reallocating the configuration's resources, e.g., so as to avoid interfering with communications that may still be occurring on those resources due to the UE's failure to receive the release command. The radio network equipment 24 may furthermore monitor for any communications still transmitted by the UE 18 on the configuration's resources and/or re-transmit the release command.

Lack of synchronization therefore may render the associated resources susceptible to interference or waste due to non-use. For example, if an activate command is not received by the UE 18, radio network equipment otherwise not configured as described herein would assume that the command was received. Yet the radio network equipment would not schedule any traffic using the resources associated with the configuration (e.g., without any sort of request from the UE), which leads to waste due to non-use. Similarly, if a release command is not received by a UE, radio network equipment otherwise not configured as described herein would assume that the command was received and that the UE has stopped using the resources associated with the configuration. If, based on that assumption, the radio network equipment were to schedule other traffic using those resources, those resources may be used by more than one UE, which leads to interference and possibly transmission failure. These problems are exacerbated with multiple types and/or numbers of operating configurations.

Some embodiments address these and/or other problems by the UE 18 confirming receipt of the command 32. In particular, the UE 18 according to some embodiments herein is configured to, responsive to receiving the command 32, transmit a confirmation message 34 with a confirmation field 36 that confirms receipt of the command 32. The radio network equipment 24 may correspondingly be configured to, responsive to transmitting the command 32, monitor for such a confirmation message 34 from the UE 18.

Such a confirmation message 34 may facilitate synchronization between the radio network equipment 24 and the UE 18 in terms of the active or released state of the operating configuration 20. The radio network equipment 24 may for example not consider the operating configuration 20 to be activated or released as commanded, until it receives the confirmation message 34 with the confirmation field 36 indicating that the UE 18 received the activate or release command 32. Accordingly, in some embodiments, confirmation herein may advantageously prevent interference on or waste of the radio resources that are semi-persistently allocated by the operating configuration 20 for communication.

Some embodiments herein concern precisely how the confirmation field 36 confirms receipt of the command 32 to activate or release the operating configuration 20. In particular, according to some embodiments, such confirmation is advantageously signaled by a change in or toggling of the value of the confirmation field 36. This change may for instance be relative to the value of the same confirmation field 36 as previously signaled in a different confirmation message or relative to an initial or default value of the confirmation field 36. Such "change" signaling contrasts with signaling confirmation using an absolute value of the confirmation field 36. For instance, a value of "1" for an exemplary single bit confirmation field 36 may signal confirmation of command receipt, not because the absolute value of "1" maps to confirmed and the absolute value of "0" maps to unconfirmed, but because that value of "1" may be changed relative to a value of "0" previously signaled for the confirmation field 36 in a previous message. Accordingly, changes in the value of the confirmation field 36 across multiple confirmation messages signals confirmation of command receipt, whereas no such change in the value of the confirmation field 36 across multiple messages signals unconfirmed command receipt.

As shown in FIG. 1, some embodiments herein accomplish this change signaling by storing, at each of the user equipment 18 and the radio network equipment 24, a value of the confirmation field 36, i.e., so as to (persistently) maintain a stored value 36S for the confirmation field 36. The stored value 36S may be for instance the value of the confirmation field 36 as last signaled, or may be an initial or default value for the confirmation field. Regardless, this stored value 36S may be used to generate or interpret the confirmation field 36 as signaled in the next confirmation message. For example, in some embodiments, the user equipment 18 confirms receipt of the command 32 by setting the value of a confirmation field 36 in a message 34 to be different than the stored value 36S for the confirmation field 36 and transmitting the message 34. Correspondingly, the radio network equipment may determine whether a received message 34 confirms receipt of the command 32 based on whether a value of the confirmation field 36 is different than a stored value 36S (at the radio network equipment 24) for the confirmation field 36.

In some embodiments, this sort of "change" signaling for confirming command receipt proves advantageous for effectively "overloading" the confirmation field 36 with the ability to confirm a number of different types of commands and/or activation statuses with respect to the operating configuration 20. In fact, the number of different command types and/or activation statuses confirmable by the confirmation field 36 may be greater than the number of values the confirmation field 36 may take on. Indeed, rather than mapping certain confirmation field values to command types in a one-to-one fashion (e.g., "1" confirms activate command or activated status, "0" confirms release command or released status), embodiments herein effectively decouple the type of command being confirmed and/or the activation status of the operating configuration 20 from the confirmation field's possible values, e.g., such that a certain value of the confirmation field does not (always) indicate a certain activation status of the operating configuration 20 and/or a confirm receipt of a certain type of command 32. Instead, the embodiments rely solely on changes in confirmation field values across multiple confirmation messages to confirm any number of command types and/or activation statuses.

In some embodiments, for example, the command 32 is either a first possible type which commands that a released operating configuration be activated, a second possible type which commands that an activated operating configuration be released, or a third possible type which commands that an activated operating configuration be re-activated with one or more different parameters. Even in embodiments where the confirmation field 36 is a single bit field with only two possible values, the confirmation field 36 may still nonetheless confirm receipt of any of those three types of commands. That is, in these and other embodiments, the confirmation field 36 is shared for confirming receipt of any of the first, second, and third types of commands.

Figure 2:
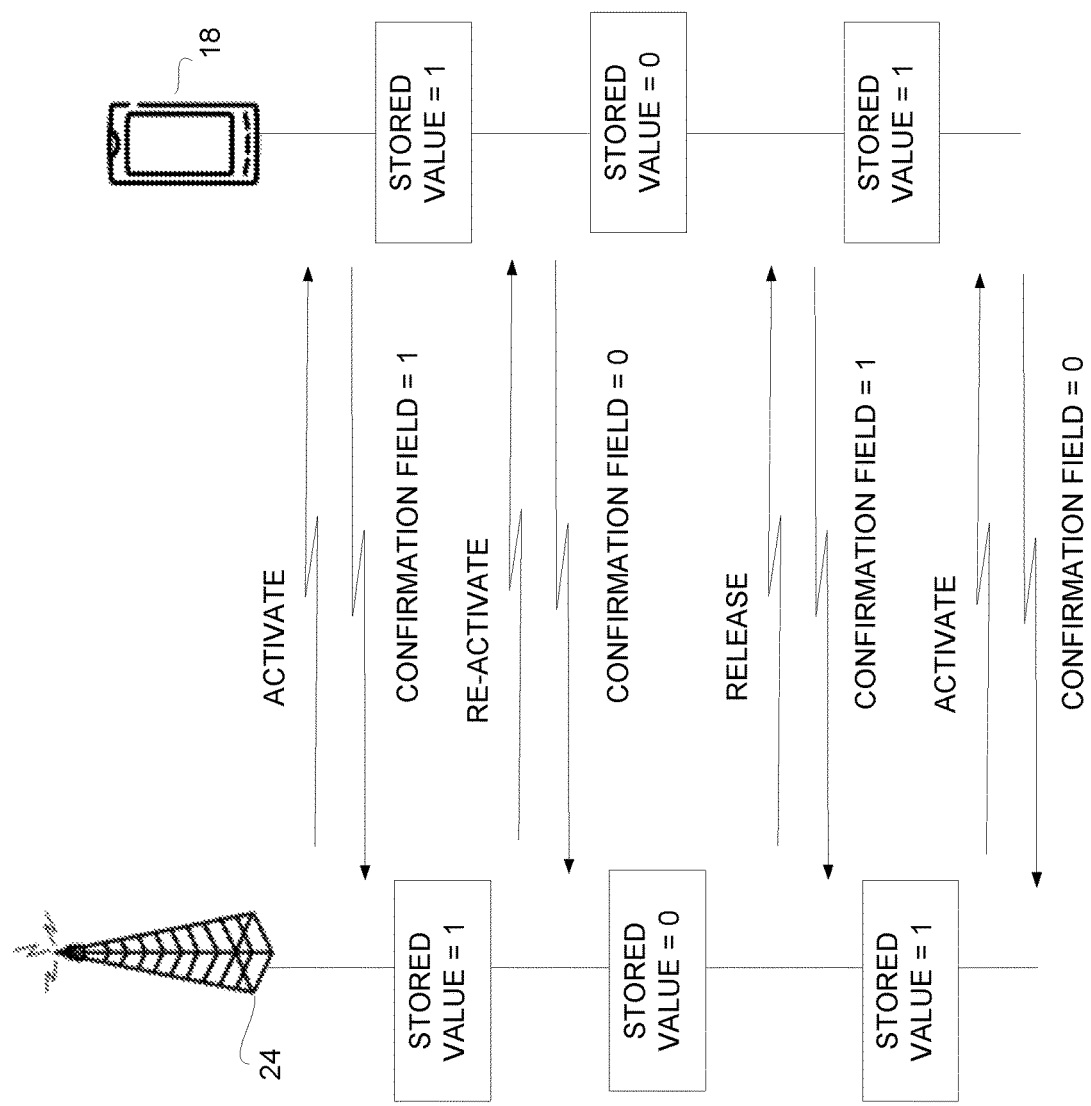
FIG. 2 is a call flow diagram illustrating an example of command confirmation using a single bit confirmation field according to some embodiments.

FIG. 2 illustrates a simple example of this using a single bit confirmation field 36. As shown, the user equipment 18 first confirms an activate command with a confirmation field value of 1, and correspondingly stores that value of 1 for the confirmation field 36. Responsive to later receiving a re-activate command, the user equipment 18 confirms that re-activate command with a confirmation field value of 0, i.e., different than the stored value of 1. The user equipment 18 then overwrites the stored value with a value of 0, to reflect that the last signaled value for the confirmation field was 0. Next, upon receiving a release command, the user equipment confirms the release command with a confirmation field value of 1, i.e., different than the currently stored value of 0, and updates the stored value to be 1. Notice here, then, that the same confirmation field value of 1 has been used to confirm both the initial activate command and the subsequent release command, as the confirmation field values are decoupled from the types of commands being confirmed and/or the activation status of the operating configuration 20. Similarly, responsive to receiving an activate command, the user equipment 18 confirms that command with a confirmation field value of 0.

Alternatively or additionally to overloading the confirmation field 36 for multiple command types and/or activation statuses, in some embodiments herein the confirmation field 36 is shared for confirming receipt of any command to activate or release any of multiple operating configurations in a certain cell. In this case, for example, the stored value for the confirmation field 36 may indicate the value of the confirmation field as last signaled for confirming receipt of a command to activate or release any operating configuration in the certain cell. In these and other embodiments, therefore, the confirmation field may be specific to a certain cell, e.g., but non-specific as to a particular one of multiple operating configurations in the cell.

In still other embodiments, the operating configuration 20 has a certain configuration index. The confirmation field 36 in this case may be shared for confirming receipt of any command to activate or release an operating configuration with the certain configuration index in any of multiple cells. In this case, the stored value for the confirmation field may indicate the value of the confirmation field as last signaled for confirming receipt of a command to activate or release an operating configuration with the certain configuration index in any of the multiple cells. In these and other embodiments, therefore, the confirmation field may be specific to a certain configuration index of the operating configuration, e.g., but non-specific as to a particular cell.

In yet other embodiments, the confirmation field may be specific to a certain cell and a certain configuration index of the operating configuration.

Figure 3:
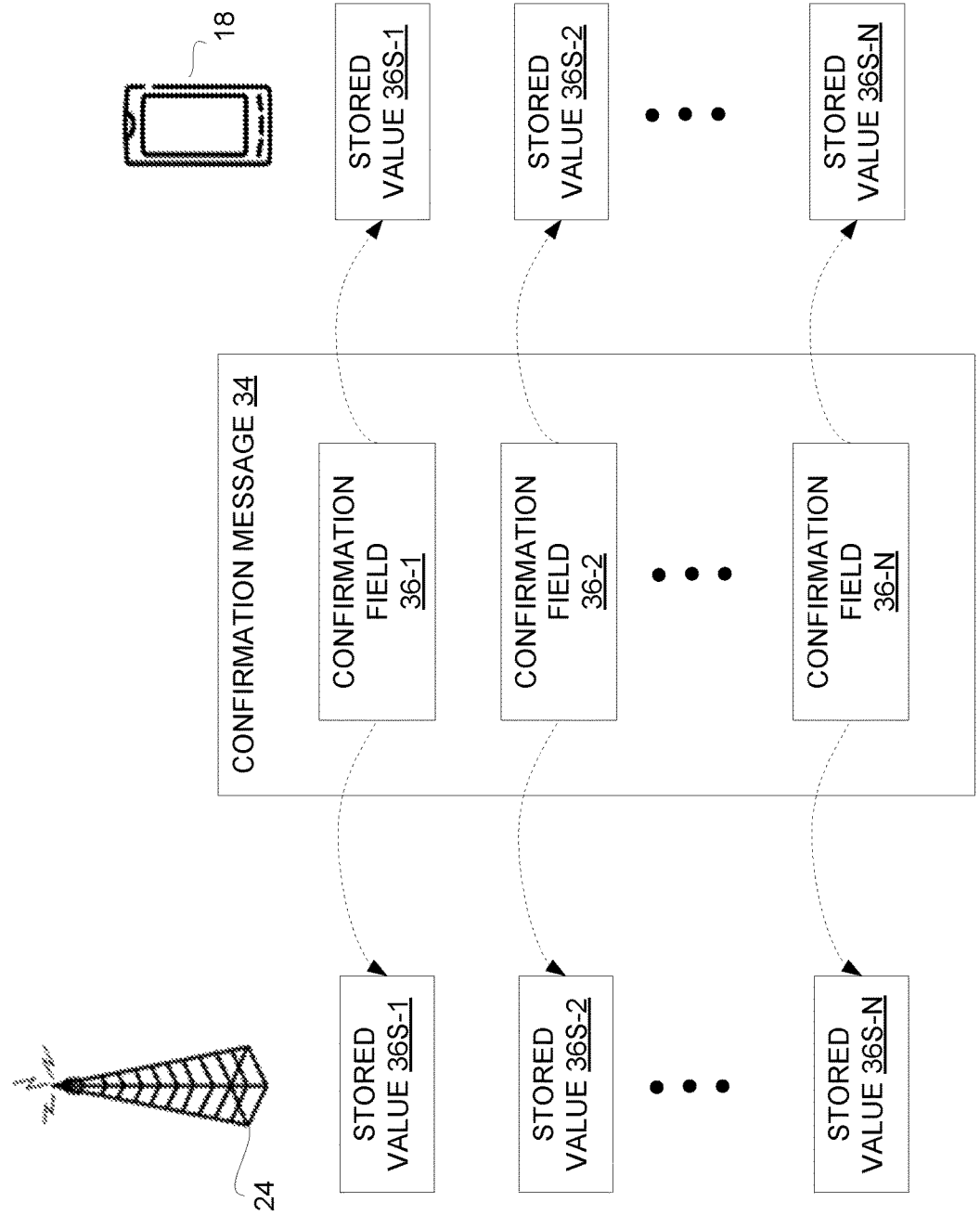
FIG. 3 is a block diagram of a wireless communication system that uses a message with multiple confirmation fields according to some embodiments.

Although discussion above has focused on only a single confirmation field 36, the message 34 may include multiple such confirmation fields 36. As shown in FIG. 3, for example, the message 34 may include N confirmation fields 36-1, 36-2, . . . 36-N, any of which may be configured as described above (e.g., in terms of overloading with respect to command type and/or activation status, and in terms of being cell-specific and/or configuration-specific). In such embodiments, though, respective stored values 36S-1, 36S-2, . . . 36S-N for those confirmation fields are maintained at the user equipment 18 and radio network equipment 24, for supporting "change" signaling as described on a confirmation field by confirmation field basis. That is, confirmation is signaled by any individual confirmation field by a change in the value of that confirmation field, without regard to the value of any other confirmation field.

In these and other embodiments, therefore, the message may include multiple different confirmation fields that are respectively dedicated for confirming receipt of commands to active or release operating configurations in different cells. In this case, a received command may be a command to activate or release an operating configuration in a certain one of the cells, and the confirmation field whose value is set for confirming receipt of the command is the confirmation field dedicated for the certain cell.

In other embodiments, the message includes multiple different confirmation fields that are respectively dedicated for confirming receipt of commands to activate or release operating configurations with different configuration indices. In this case, a received command may be a command to activate or release an operating configuration with a certain configuration index, and the confirmation field whose value is set for confirming receipt of the command is the confirmation field dedicated for the certain configuration index.

According to various embodiments, the UE 18 may deliver the confirmation message via RRC, Medium Access Control (MAC) (such as in a MAC Control Element (CE)), Physical Uplink Shared Channel (PUSCH), or Physical Uplink Control Channel (PUCCH), for example. The confirmation message includes some number of bits, each of which may, for example, represent a respective cell index. In such an embodiment, the value of a particular bit may indicate confirmation of a command (e.g., an activation command, a release command) pertaining to the corresponding cell.

Alternatively, each of the bits may represent, for example, the index of a given operating configuration. In such an embodiment, the value of a particular bit may indicate confirmation of a command pertaining to the corresponding operating configuration. An example of such an operating configuration may be a specific SPS configuration in which certain time/frequency resources are to be used by the UE 18 at periodic intervals. In another example, an operating configuration includes a pool of time resources represented by a bitmap in which each bit indicates whether a certain subframe can be used by the UE for transmission. The bitmap may be repeated periodically and may additionally, in some embodiments, be associated with a set of transmitting parameters (e.g., Physical Resource Blocks (PRBs), MCSs) to be used when the UE is allowed to transmit according to such bitmap.

Particular embodiments above described a UE 18 that may, upon reception of a certain command, trigger transmission of a confirmation message in which a certain field is toggled or changed in value (i.e., as compared to the value of that field in a previous confirmation message). Particular embodiments further described that multiple commands may be confirmed using a confirmation message in which a field is toggled or modified a corresponding number of times (e.g., toggled once per relevant command to be acknowledged).

The UE 18 may, in some embodiments, confirm a previously received command (e.g., an activation command, a release command, a reactivation command). Such embodiments may include, for example, the radio network equipment 24 sending an activation or deactivation command for cellular operations in different cells, e.g., to indicate that the UE 18 should start or stop using a certain cell, or to indicate that SPS or other cellular features should or should not be used on a certain cell. For example, the network may send SPS activation and/or release commands to the UE 18 to activate and/or release certain SPS configurations in certain cells. Other embodiments may include, for example, the radio network node 24 sending activation and/or deactivation commands for certain operating configurations previously provided by the network. In particular, each of these operating configurations may correspond to a different set of transmitting parameters including, e.g., time/frequency resource(s), Modulation and Coding Scheme (MCS), power, Hybrid Automatic Repeat reQuest (HARQ) configuration(s), beam configuration(s), antenna configuration(s), etc. Accordingly, each of these operating configurations may be addressed by a configuration index. In this case, the radio network equipment 24 may need to specifically address the operating configuration via its related index in order to activate and/or release it and the UE 18 may need to acknowledge the correct reception of the command pertaining to the indicated configuration. According to a particular example, a first operating configuration may include a specific SPS configuration, whereas a second operating configuration may include a pool of time resources represented by a bitmap in which each bit indicates whether a certain subframe may be used by the UE 18 for transmission.

One example in which the UE 18 may acknowledge a command may be by toggling a certain signaled bit between 0 and 1 whenever a command requiring confirmation is received. For example, the UE 18 may support transmission of a confirmation message that comprises a confirmation field comprising one or more bits. Each of the bits may, in some embodiments, correspond to a cell and/or type of setting that is configurable by the radio network equipment 24. According to one example in which each bit corresponds to a respective cell, the UE may confirm receipt of a command from the radio network equipment 24 that activates or deactivates an operating configuration in a given cell by transmitting a confirmation message in which the bit of the confirmation field that corresponds to the given cell is toggled (e.g., as compared to the value of that bit as transmitted in a previous confirmation message). Such a confirmation message may inform the radio network equipment 24 that the command has been correctly received for the given cell.

According to other embodiments, each of the bits may correspond to a respective operating configuration. In such an example, the UE 18 may confirm receipt of a command from the radio network equipment 24 that activates or deactivates a given operating configuration by transmitting a confirmation message in which the bit of the confirmation field that corresponds to the given operating configuration is toggled (e.g., as compared to the value of that bit as transmitted in a previous confirmation message). Such a confirmation message may inform the network that the command has been correctly received for the given cell.

Further, as previously discussed, the confirmation field according to some embodiments may comprise an array of independently configurable bit-fields (and/or multi-bit fields). In such an embodiment, each index of the array may be mapped to, e.g., a cell or operating configuration.

One or more embodiments will now be described in certain contexts, such as SPS. In 3GPP Release 14, in the context of vehicle-to-everything (V2X), the eNB is allowed to configure multiple SPS configurations (up to 8) to a UE both in the UL and in the sidelink (SL). Each of these multiple SPS configurations is identified by an SPS index and may specify a different set of periodic resources spaced by different time intervals.

The configuration as well as the activation/release procedures are similar to those in legacy LTE. However, the eNB also needs to indicate in the PDCCH the SPS index that the UE should activate/release and the carrier in which the specific SPS configuration should be applied.

The possibility to configure multiple SPS configurations is currently limited to V2X-capable UEs. In fact, different types of traffic may fall within the umbrella of V2X, each having specific characteristics in terms of packets size and periodicities depending on the priority of the packets and triggering conditions which in turn depend on a set of external conditions, such as vehicle speed, trajectory, position, etc.

However, in future releases, the need for multiple SPS configurations may become relevant also for other technologies or to simply offer to the network more flexibility when configuring SPS. For example, the network may configure different SPS configurations in different cells depending on type of cells (e.g. whether the cell is a Licensed Assisted Access, LAA, cell or not) or on the load of the cell.

The MAC CE for the SPS confirmation currently has a fixed size of zero bits. This makes the SPS confirmation procedure difficult to be applied to the case of multiple SPS configurations. In case the network configures multiple SPS configurations simultaneously, the UE cannot explicitly indicate which of such SPS configurations have been correctly received.

Because of that, the eNB cannot configure multiple SPS configurations simultaneously, otherwise it would be ambiguous which activation/release commands have been correctly received. This may result in potentially long latency, since the eNB needs to activate/release the SPS configurations sequentially and wait for the SPS confirmation MAC CE of a previous activation/release command before activating/releasing another SPS configuration.

Considering that in the worst case the eNB may need to configure up to 8 SPS configurations in each of the up to 32 serving cells, the above-mentioned procedure may eventually result in several hundreds of milliseconds. Additionally, also the resource wastage as well as the UE battery consumption may be significantly affected.

Accordingly, embodiments herein include methods to efficiently deliver the SPS confirmation, e.g., in case of multiple SPS configurations configured to the UE, possibly in different carriers. Embodiments for instance include different methods to report SPS confirmation MAC CE to confirm to the eNB that the UE has received multiple SPS (re)activation/release commands on multiple cells.

Some embodiments prove advantageous in that the UE can deliver a single SPS confirmation MAC CE which contains the activation/release status of multiple SPS configurations. Unlike other SPS confirmation methods, this method in some embodiments alleviates latency, resource wastage and battery consumption of the UE.

In some embodiments, an activation command may comprise an SPS grant sent in DCI containing an SPS activation command, e.g. the SPS index of the SPS configuration to be activated, the associated transmitting parameters such as the MCS, and the PRBs, and the index of the cell on which such SPS configuration shall be activated. Alternatively or additionally, the release command may be an empty SPS grant (e.g. empty MCS/PRBs, or all '1's MCS/PRBs bits) or an explicit release flag sent on DCI to release a currently active SPS configuration. A reactivation command may comprise an activation command carrying a new SPS grant sent in DCI for an already active SPS configuration, where the SPS grant for such SPS configuration is different from the previous SPS grant valid for this SPS configuration.

It should be noted that when it herein says that the UE toggles bits in message (such as in a MAC CE), it may mean that the UE triggers a transmission of said message wherein the bits are toggled, i.e. setting the value of a bit to the opposite of what it previously was set to (e.g. a bit previously set to 0 becomes set to 1 and vice versa). However, it should be appreciated that triggering a transmission may not necessarily result in a transmission directly, rather it may be so that the UE triggers a transmission of the message at a certain time, but the message is transmitted later depending on when the UE has an opportunity to perform a transmission.

Some of the below embodiments refer to information sent in UL on MAC CE. However the same methods disclosed therein after can be generalized by a person skilled in the art and be applicable to other channels, e.g. on the physical uplink control channel (PUCCH), or uplink control information (UCI) in the physical uplink shared channel (PUSCH), etc.

Furthermore, some of the below embodiments refer to SPS configurations, i.e. to configurations of periodic time/frequency resources, that can be (re)activated/released, and take into account in some embodiments the cells in which such SPS configurations can be configured, and in some other embodiments the indexes of such SPS configurations. However, the below embodiments can be applied equally to other type of operating configurations which identify sets or patterns of transmitting parameters (e.g. time/frequency resources, MCS, power, etc.) that can be (re)activated/released. Each operating configuration may be addressed by an index and can be configured in one or more cells.

Figures 4, 5:
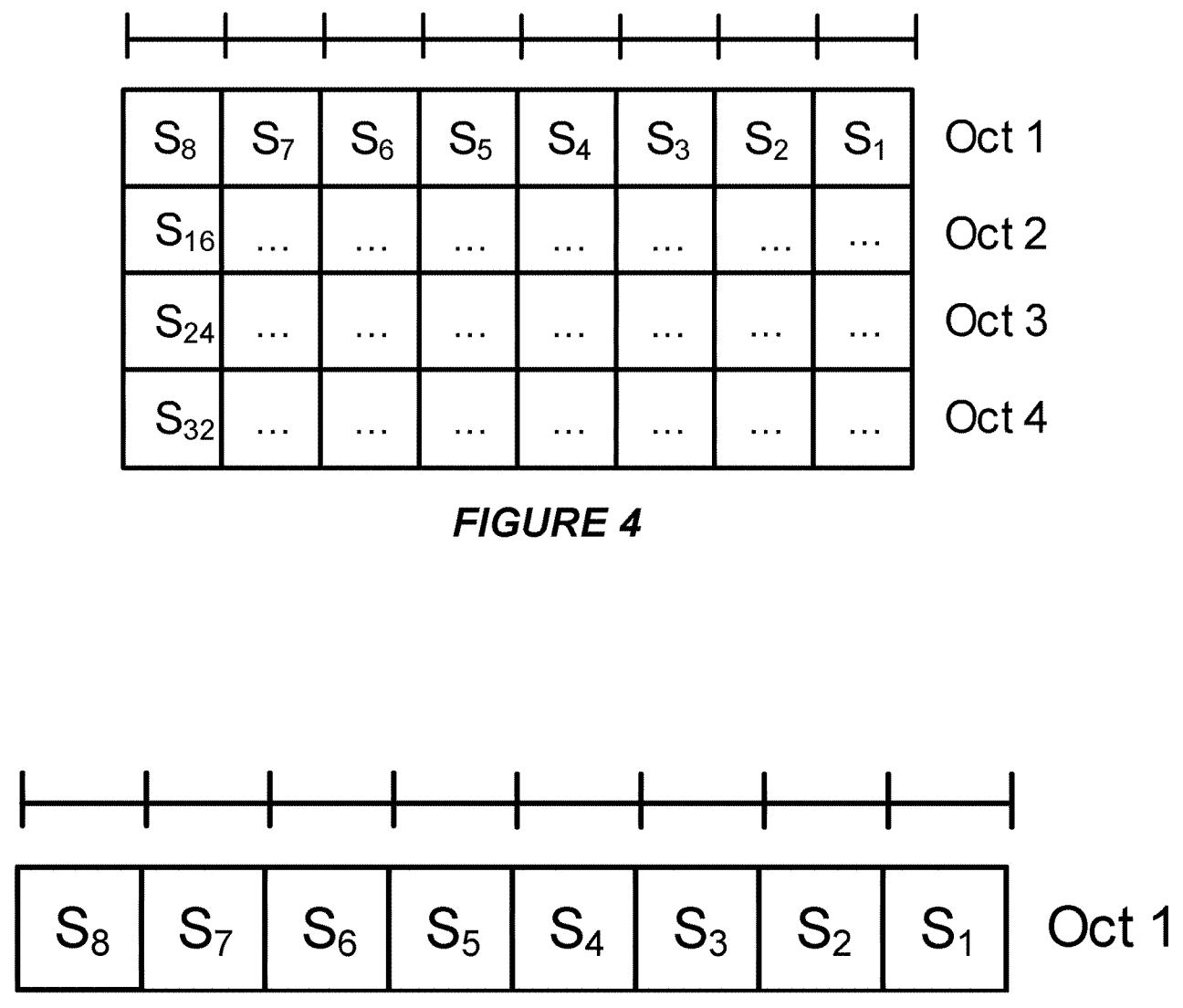

Consider now a first embodiment in which a toggling mechanism is provided per cell index. According to some embodiments, an SPS confirmation MAC CE consists of one or more octets where each bit indicates the SPS activation status for a certain cell as illustrated in FIG. 4. In particular, each bit corresponds to a configured cell index. Such SPS confirmation MAC CE can be used for UL, SL, DL and/or for different technologies (e.g. LAA, V2V, etc). In this case, the SPS confirmation MAC CE in FIG. 4 may contain an additional field to indicate whether the SPS confirmation MAC CE contains information related to UL SPS, SL SPS, DL SPS, and/or if that is valid for V2V, LAA or other technologies.

In this embodiment, and in some of the below embodiments it is assumed, that a cell index is associated by upper layers (e.g., radio resource control, RRC) to each cell. In some cases, such cells may be under the control of an eNB different from the eNB that provides an SPS scheduling grant, or they may correspond to frequencies outsides this eNB or E-UTRAN coverage (as for the SL case). In such cases, the eNB providing an SPS scheduling grant for a certain cell/frequency possibly belonging to another eNB (possibly also in another operator network), or outside the coverage of this eNB or of the E-UTRAN, also associates to such cell/frequency a proper cell index, which is then used by the UE for confirming the SPS activation/deactivation.

Upon activation/release of an SPS configuration for one or more cells and for any configured SPS configuration, the UE triggers a transmission of a MAC CE to indicate this. In the MAC CE, the UE toggles the bit corresponding to the affected cell compared to a previously indicated value. Therefore, there is no one-to-one association between bit value and SPS activation status (e.g. bit=0 indicates SPS released in that cell and bit=1 indicates SPS active in that cell). Instead, the UE toggles the bit (compared to the previous value) whenever it (re)activates/releases SPS.

Consider for simplicity an example for the case of SPS (re)activation/release for one serving cell. In this example, the eNB provides via RRC signaling one or more SPS configurations, each with an associated SPS index and a set of other transmitting parameters. The eNB sends an indication to the UE to activate an SPS configuration with a certain SPS index, say SPS index 1 on a cell, say cell 1. The UE toggles the bit S1 from 0 to 1 and triggers transmission of the SPS confirmation MAC CE with all '0's bits except for S1=1. The eNB thereafter sends an indication to the UE to activate an SPS configuration with a certain SPS index, say SPS index 2, for the cell 1. The UE then toggles the bit S1 from 1 to 0 and triggers the SPS confirmation MAC CE with all '0's bits. The eNB next sends a release command in PDCCH to release the SPS configuration with a certain SPS index, say SPS index 2, for the cell 1. The UE then toggles the bit S1 from 0 to 1 and triggers transmission of the SPS confirmation MAC CE with all '0's bits except for S1=1. Next, the eNB sends a reactivation command in PDCCH to activate the SPS configuration with a certain SPS index, say SPS index 1, for the cell 1, and with an SPS grant (i.e. a set of transmitting parameters) different from the one previously indicated for this SPS index in step 2. The UE then toggles the bit S1 from 1 to 0 and triggers transmission of the SPS confirmation MAC CE with all '0's bits.

The above procedure can be extended to the case in which the eNB may simultaneously send in the same PDCCH resource multiple (re)activation/release commands in different downlink control information (DCI) messages, and the UE triggers an SPS confirmation MAC CE containing SPS confirmation for multiple received (re)activation/release commands.

In one version of this embodiment, the UE will in response to activating an SPS configuration determine whether this SPS configuration is already active and the UE will also determine whether the activation command indicates one or more parameters for the SPS configuration which are different compared to the currently used parameters for the SPS configuration. If the new parameters are different compared to the previous parameters, the UE will toggle the corresponding bits. This is illustrated in the step above concerning the reactivation command.

In one version of the MAC CE described in FIG. 4, the number of octets present depends on the number of configured cells. In particular, if multiple SPS configurations have not been configured or activated to a UE, a MAC CE with fixed size of zero bits is used to confirm SPS (re)activation/release. In one flavor of this embodiment, the condition on using a zero bits MAC CE can be that the UE has an SPS configuration for a particular cell. For example, only use a zero-bit MAC CE if the UE has a single SPS configuration on the PCell; however if the UE has a single SPS configuration but this is on an SCell, then the UE may apply a non-zero bit MAC CE as described in the following rules (which in other embodiments may apply irrespective of whether the commands apply to the PCell or Scell): (i) If the number of configured cells is higher than 1 and smaller than or equal to 8, the SPS confirmation MAC Control Element consists of 1 octet; (ii) If the number of configured cells is higher than 8 and smaller than or equal to 16, the SPS confirmation MAC Control Element consists of 2 octets; (iii) If the number of configured cells is higher than 16 and smaller than or equal to 24, the SPS confirmation MAC Control Element consists of 3 octets; (iv) If the number of configured cells is higher than 24 and smaller than or equal to 32, the SPS confirmation MAC Control Element consists of 4 octets; (v) And so on, if the number of bits in the MAC Control Element is larger than 32.

Consider now a second embodiment that provides a toggling mechanism per SPS index. In one such embodiment, the new SPS confirmation MAC CE consists of some octets where each bit indicates the activation status of the SPS configuration associated to a certain SPS index. FIG. 5 illustrate an example where for simplicity up to 8 SPS configurations are considered. In FIG. 5, each bit corresponds to a configured SPS configuration which is indicated by a given SPS index Similar to the first embodiment above, upon receiving an SPS (re)activation/release command for a certain SPS configuration associated to a certain SPS index and regardless of the cell where such SPS configuration is applied, the UE toggles the bit corresponding to the affected SPS index.

In FIG. 5 it is illustrated a scenario supporting up to 8 SPS configurations; however there may be more octets to support more SPS configurations. In one version of this embodiment, the number of octets in the MAC CE depends on the number of SPS configurations configured to the UE. Similar rules to the ones mentioned for the first embodiment above can be used to determine how many octets the UE shall use. A MAC CE with a fixed size of zero bits shall be used if multiple SPS configurations have not been configured or activated by the eNB for the UE.

Consider now a third embodiment that concerns retransmission of (re)activation/release commands in different scenarios, e.g., in addition to the mechanism of the first and/or second embodiments. In this third embodiment, the eNB has sent at time T1 one or more SPS (re)activation/release commands in DCIs. And one of the following conditions occur: (1) the eNB does not receive the expected SPS confirmation MAC CE within a certain time T1+X, e.g. due to loss of the SPS confirmation MAC CE; (2) the eNB receives the SPS confirmation MAC CE within T1+X, but it contains one or more bits that were not toggled even though the eNB sent at time T1 SPS (re)activation/release commands which should have caused the toggling of such bits according to the procedures in the first or second embodiment; or (3) For the case of UL SPS, if the SPS confirmation MAC CE in condition 1, and 2 has not been yet received by the eNB, and either (3A) the eNB has sent a (re)activation command and it has not received an UL transmission within a certain time T1+X, corresponding to the SPS UL grant indicated in the (re)activation command, i.e. on the same physical resources/MCS indicated; or (3B) the eNB has sent a release command and receives an UL transmission corresponding to the SPS UL grant which was released by the eNB.

If condition 1 above occurs, the eNB will resend on DCIs at time T2 (with T2>T1) the same (re)activation/release commands sent at time T1.

If condition 2 above occurs, the eNB will resend on DCIs at time T2 only the (re)activation/release commands for which toggling of affected bits was not detected on the SPS confirmation MAC CE received at time T1+X. The (re)activation/release commands that are to be sent at time T2 will be the same as the ones sent at time T1.

If condition 3 above occurs, the eNB knows from the UL transmissions which are the (re)activation commands that were not correctly decoded by the UE. Therefore, it will resend on DCIs at time T2 only the (re)activation/release commands did not correctly received at time T1+X. The (re)activation/release commands that are to be sent at time T2 will be the same as the ones sent at time T1.

The value of X, which determines when the eNB resends the (re)activation/release commands, is selected by the eNB. In principle, the UE should be able to send the SPS confirmation MAC CE at the next transmission opportunity granted by the eNB. However, since the UE may need to transmit higher priority MAC CEs, or the transmission of the MAC CE may be dropped due to listen before talk (LBT) (in case of coexistence of transmissions with non-3GPP technologies), the SPS confirmation MAC CE may not be transmitted in the next transmission opportunities.

Therefore, the value of X may be selected by the eNB according to any of the following rules: (i) X is a timer, for example covering one or more transmission opportunities; (ii) X is implicitly determined by the number of transmission opportunities on which the UE has not sent the expected SPS confirmation MAC CE after T1; (iii) in case condition 2 above occurs, the value of X is determined by the reception of the SPS confirmation MAC CE which contains some non-toggled bits, i.e. the SPS confirmation MAC CE is correctly received within T1+X, but some bits where not toggled as expected. In this case, the eNB retriggers transmission of (re)activation/release commands upon reception of such SPS confirmation MAC CE; or (iv) in case condition 3 above occurs, the value of X is determined by the reception of the UL transmission from which the eNB can deduce that a certain (re)activation/release command has not been correctly received by the eNB. In this case, the eNB retriggers transmission of (re)activation/release commands upon reception of such UL transmission.

Consider now a fourth embodiment that provides a toggling mechanism upon loss of an SPS confirmation MAC CE, e.g., in addition to the methods of the third embodiment above. In this embodiment, it is assumed that the (re)activation/release command(s) sent at time T2 are correctly received. If the (re)activation/release commands sent on DCI(s) at time T1 were not correctly received, the UE toggles at time T2 (or immediately after depending on the DCI processing time) the affected bit(s), following mechanisms in the first or second embodiment, and triggers the SPS confirmation MAC CE. If the (re)activation/release command sent on DCI(s) at time T1 were correctly received, the UE does not toggle at time T2 (or immediately after depending on the DCI processing time) the affected bit(s), and triggers the SPS confirmation MAC CE. Since the DCI(s) at time T1 were correctly received in this case, the UE has already toggled at time T1 (or immediately after depending on the DCI processing time) the affected bit(s). Therefore, upon reception of the same (re)activation/release command on DCI at time T2, the UE will not toggle the affected bits.

Another way of describing the above is that the UE will upon receiving an activation command determine whether the SPS resource already is activated or not and depending on this toggle the bits or not. If the SPS resource is already activated when the UE receives an activation command the UE may refrain from toggling the associated bit(s). But if on the other hand the SPS resource is not activated the UE would toggle the associated bit(s).

Figure 6:
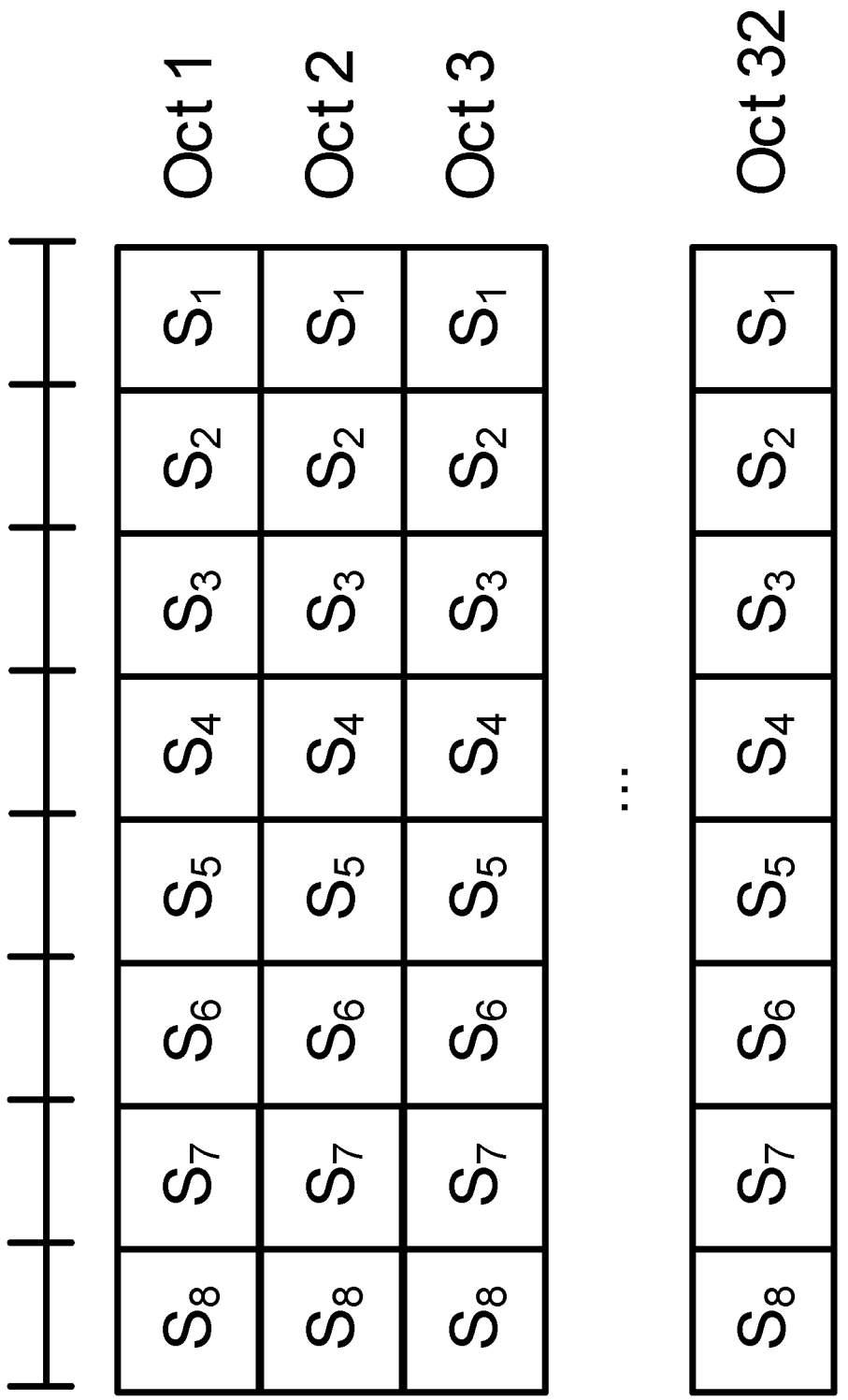
FIG. 6 is a block diagram of a message for command confirmation for semi-persistent scheduling (SPS) in the form of a medium access control (MAC) control element (CE) according to yet embodiments.

Consider now a fifth embodiment that concerns a MAC CE for joint confirmation of SPS index and cell index, e.g., in addition to the methods in the first, second, third, or fourth embodiment. In this embodiment, the UE reports in a new SPS confirmation MAC CE, the activation status indicating both the SPS configuration (addressed by a certain SPS index) and the cell (addressed by a certain cell index) in which this SPS configuration has been (re)activated/released. As shown in FIG. 6, for example, each bit corresponds to a configured SPS configuration which is indicated by a given SPS index and cell index.

More particularly, the MAC CE design in FIG. 4 and FIG. 5 does not allow the UE to report the activation status of a certain SPS configuration on a certain cell; instead it only indicates that some SPS configuration has been activated/released on the cell but it is not possible to indicate which SPS configuration has been activated/released. Therefore, if for example the MAC CE design in FIG. 4 is used, the eNB cannot simultaneously (re)activate/release in the same cell multiple SPS configurations; otherwise it would be ambiguous which SPS configuration in such cell has been correctly (re)activated/released. If the MAC CE design in FIG. 5 is used, the eNB cannot simultaneously (re)activate/release the same SPS configuration in multiple cell; otherwise it would be ambiguous in which cell such SPS configuration has been correctly (re)activated/released.

In FIG. 6, by contrast, each bit represents in each octet the SPS index corresponding to the up to 8 SPS configurations that can be configured by the eNB in each cell. Each octet instead represents the cell index of the up to 32 cells in which the eNB can configure the SPS.

The number of octets in FIG. 6 depends on the number of configured cells. If multiple SPS configurations have not been configured or activated to a UE, a MAC CE with fixed size of zero bits is used to confirm SPS (re)activation/release. In one flavor of this embodiment the condition on using a zero bits MAC CE can be that the UE has an SPS configuration on a particular cell. For example, only use a zero bit MAC CE if the UE has a single SPS configuration on the PCell; however if the UE has a single SPS configuration but this is on an SCell then the UE may apply a non-zero bit MAC CE as described in the following rules: (i) If the number of configured cells is 1, the SPS confirmation MAC Control Element consists of 1 octet; (ii) If the number of configured cells is 2, the SPS confirmation MAC Control Element consists of 2 octets; (iii) If the number of configured cells is 3, the SPS confirmation MAC Control Element consists of 3 octets; (iv) And so on.

Consider now a sixth embodiment concerning the MAC CE for SPS confirmation, e.g., in addition to any of the previous embodiments. In this embodiment, each cell configured to the UE with SPS, is associated to a group of cells. When the UE reports a MAC CE for SPS confirmation to the eNB in a certain cell, say cell A, it only reports in this MAC CE the SPS confirmation associated to the cells belonging to the same group of say cell A. The cell to which the UE reports the MAC CE may be or may be not configured with SPS, and it may be scheduled, as in legacy carrier aggregation, by the eNB either with cross-carrier scheduling or self-carrier scheduling.

Depending on the number of cells associated to each group, the size (i.e. number of octets) of the MAC CE reported to eNB in a given cell, say cell A, may vary. For example, if the cell to which the UE is sending a certain MAC CE for SPS confirmation, say cell A, belongs to a groupA which is made up of less than 8 cells, only one octet is reported.

Accordingly, if this sixth embodiment is implemented in conjunction with the first embodiment, the following policy may be adopted. If the number of cells configured with SPS that are associated (i.e. belonging to the same group) to the cell in which MAC CE SPS confirmation is sent by the UE, is equal to 1, the SPS confirmation MAC Control Element consist of zero octets, i.e. a zero bit MAC CE is sent and no toggling mechanism is adopted. If the number of cells is higher than 1 and smaller than or equal to 8, the SPS confirmation MAC Control Element consists of 1 octet. If the number of cells is higher than 8 and smaller than or equal to 16, the SPS confirmation MAC Control Element consists of 2 octets. And so on.

In this case, it is assumed that each cell configured with SPS and belonging to a certain group is provided with an index which is unique within the group, but can be the same across different groups. In case there is only 1 cell configured with SPS in the group, no indexing is needed, i.e. a zero-bit MAC CE is reported for that cell.

On the other hand, if this sixth embodiment is implemented in conjunction with the second embodiment, the following policy may be adopted. The SPS confirmation reported to a certain cell A contains the SPS configuration indexes configured in the cells belonging to the group of cell A.

If this sixth embodiment is implemented in conjunction with the fifth embodiment, the following policy may be adopted. If the number of cells configured with SPS that are associated (i.e. belonging to the same group) to the cell in which MAC CE SPS confirmation is sent by the UE, is equal to 1, the SPS confirmation MAC Control Element consists of 1 octet. If the number of cells is equal to 2, the SPS confirmation MAC Control Element consists of 2 octets. If the number of cells is equal to 3, the SPS confirmation MAC Control Element consists of 3 octets. And so on.

In view of the above, some embodiments herein include methods to efficiently deliver an SPS confirmation in case of multiple SPS configurations configured to the UE, possibly in different carriers. For example, some embodiments include different methods to report SPS confirmation MAC CE to confirm to the eNB that the UE has received multiple SPS (re)activation/release commands on multiple cells.

Some embodiments prove advantageous in that a UE can deliver a single SPS confirmation MAC CE which contains the activation/release status of multiple SPS configurations. Alternatively or additionally, unlike other SPS confirmation methods, some methods herein alleviate latency, resource wastage and battery consumption of the UE.

As used herein, "wireless device" refers to a device capable, configured, arranged and/or operable to communicate wirelessly with network equipment and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards, e.g., promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network equipment. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In another scenario, a wireless communication device or user equipment as described herein may be comprised in or otherwise associated with a vehicle and may perform monitoring and/or reporting of the vehicle's operational status or other functions associated with the vehicle.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As used herein, "radio network equipment" refers to equipment capable, configured, arranged and/or operable to communicate directly or indirectly with a wireless device and/or with other equipment in the wireless communication network that enable and/or provide wireless access to the wireless device. Examples of radio network equipment include, but are not limited to, access points (APs), in particular radio access points or nodes. Radio network equipment may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Radio Network equipment" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of radio network equipment include multi-standard radio (MSR) radio equipment such as MSR BSs, network controllers such as radio network controllers (RNCs) or base station controllers (BSCs), base transceiver stations (BTSs), transmission points, and transmission nodes.

As used herein, the term "radio node" is used generically to refer both to wireless devices and network equipment, as each is respectively described above.

Although various embodiments herein are described with respect to a user equipment, those embodiments are extendable to a wireless device.

The wireless communication system described herein may represent any type of communication, telecommunication, data, cellular, and/or radio network or other type of system. In particular embodiments, the wireless communication system may be configured to operate according to specific standards or other types of predefined rules or procedures. Thus, particular embodiments of the wireless communication system may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Figure 7A:
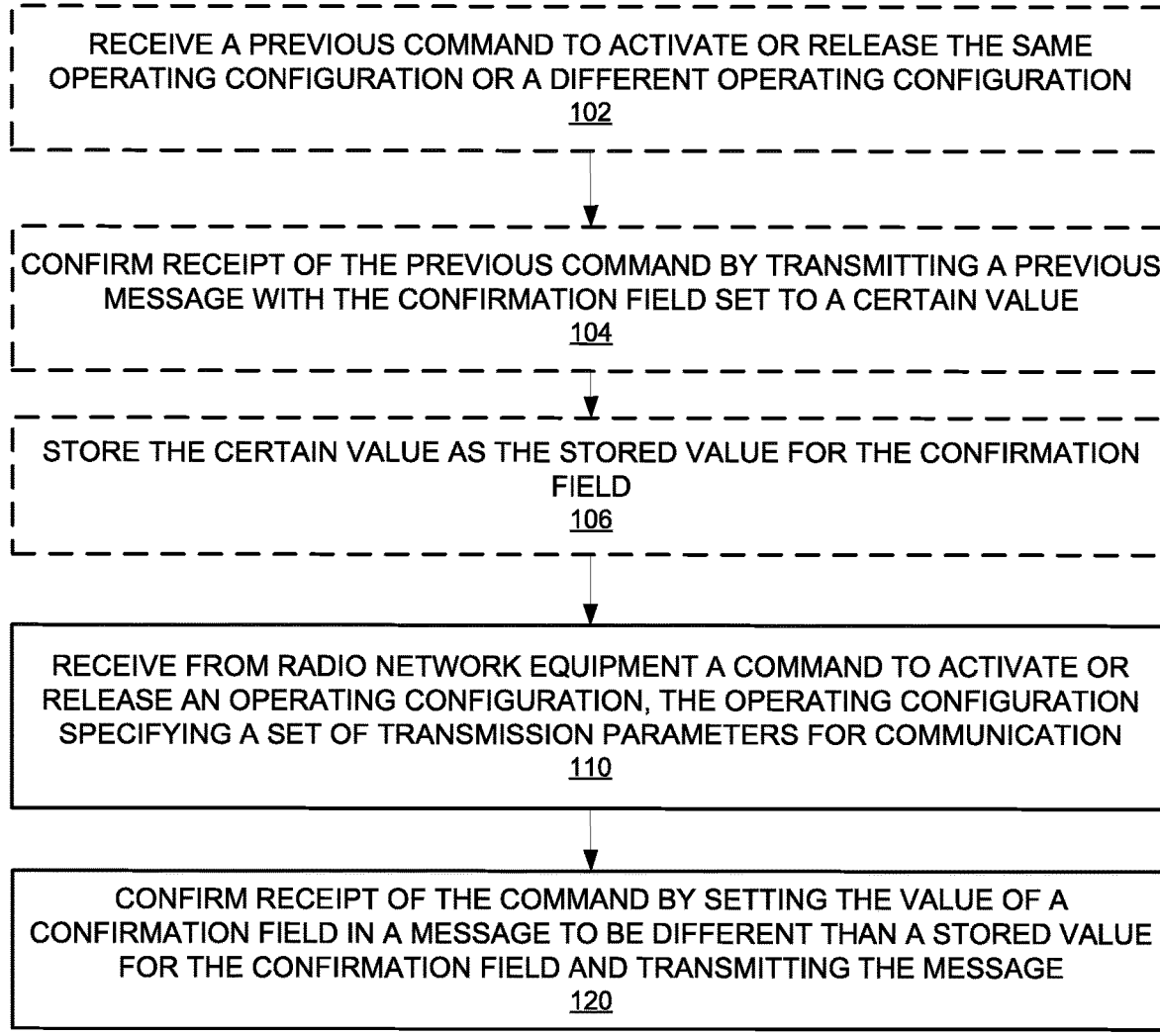
FIG. 7A is a logic flow diagram of a method performed by a user equipment according to some embodiments.

In view of the above modifications and variations, FIG. 7A illustrates a method performed by a user equipment 18 according to some embodiments. The method comprises receiving from radio network equipment 24 a command 32 to activate or release an operating configuration 20 (Block 110). The operating configuration 20 specifies a set of transmission parameters for communication. The method also comprises confirming receipt of the command 32 by setting the value of a confirmation field 36 in a message 34 to be different than a stored value for the confirmation field 36 and transmitting the message 34 (Block 120).

In some embodiments, for example, the stored value for the confirmation field 36 is a value to which the confirmation field 36 was set in a message last transmitted for confirming receipt of a last received command. In these and other embodiments, therefore, the method may further comprise, before receiving the command 32 in Block 110, receiving a previous command to activate or release the same operating configuration or a different operating configuration (Block 102); confirming receipt of the previous command by transmitting a previous message with the confirmation field 36 set to a certain value (Block 104); and storing the certain value as the stored value for the confirmation field 36 (Block 106).

The method may furthermore incorporate any of the aspects described above with respect to the previous Figures.

Figure 8A:
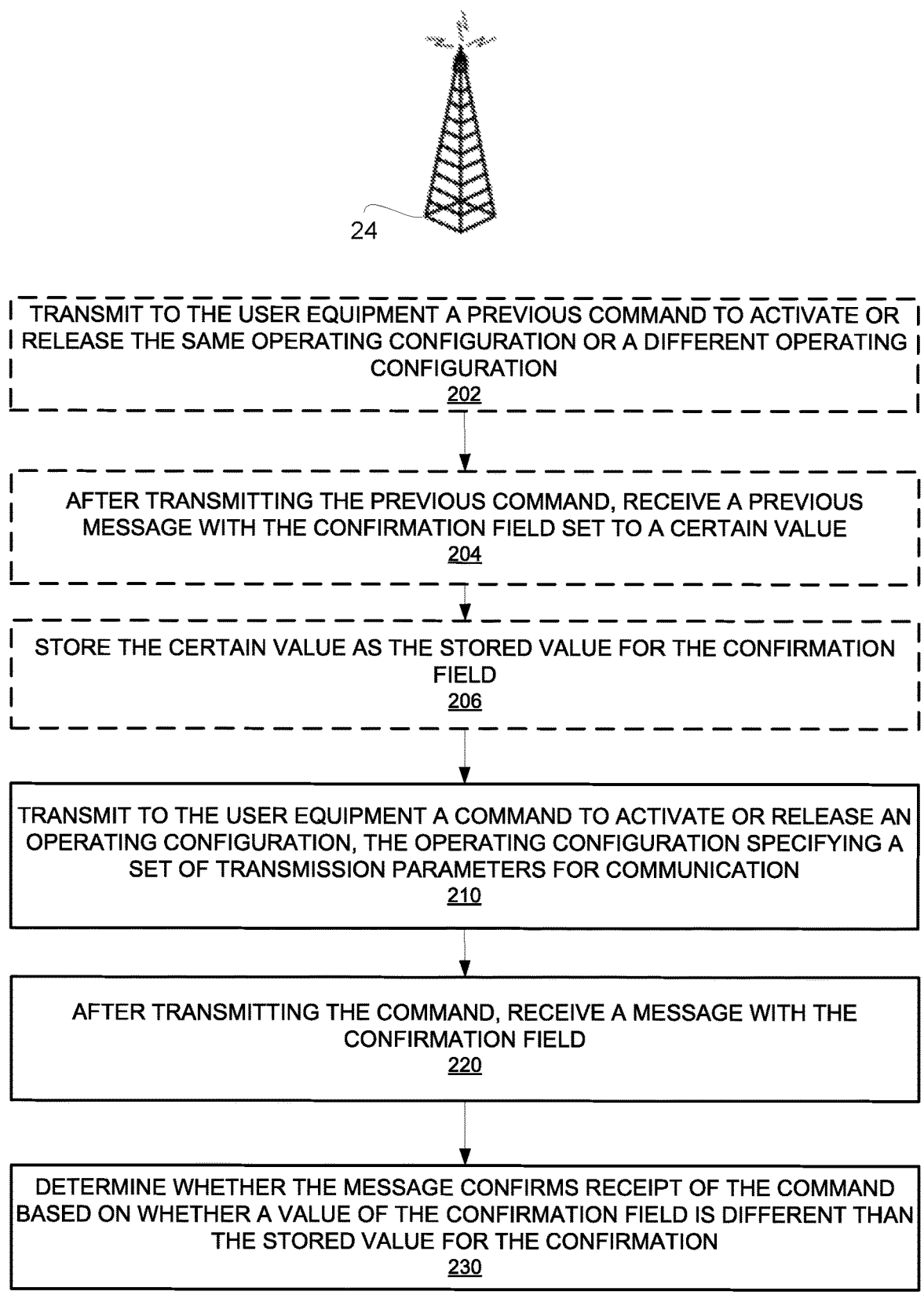
FIG. 8A is a logic flow diagram of a method performed by radio network equipment according to some embodiments.

FIG. 8A correspondingly shows a method performed by radio network equipment 24 configured for use in a wireless communication system 10. The method comprises transmitting to a user equipment 18 a command 32 to activate or release an operating configuration 20, the operating configuration 20 specifying a set of transmission parameters for communication (Block 210). The method also comprises, after transmitting the command 32, receiving a message 34 with a confirmation field 36 (Block 220). The method may further comprise determining whether the message 34 confirms receipt of the command 32 based on whether a value of the confirmation field 36 is different than a stored value for the confirmation field 36 (Block 230).

In some embodiments, for example, the stored value for the confirmation field 36 is a value to which the confirmation field 36 was set in a message last received for confirming receipt of a last transmitted command. In these and other embodiments, therefore, the method may further comprise, before transmitting the command 32 in Block 210, transmitting to the user equipment 18 a previous command to active or release the same operating configuration or a different operating configuration (Block 202); after transmitting the previous command, receiving a previous message with the confirmation field 36 set to a certain value (Block 204); and storing the certain value as the stored value for the confirmation field 36 (Block 206).

The method may furthermore incorporate any of the aspects described above with respect to the previous Figures.

FIG. 7B illustrates a method performed by a user equipment 18 according to other embodiments. The method comprises receiving from radio network equipment 24 a command 32 to activate or release an operating configuration 20 (Block 130). The operating configuration 20 specifies a set of transmission parameters for communication. The method also comprises confirming receipt of the command 32 by setting the value of a confirmation field 36 in a message 34 to be different than a default value (e.g., '0') for the confirmation field 36 and transmitting the message 34 (Block 140).

In some embodiments, a value of the confirmation field 36 that is different than the default value confirms receipt of the command 32, and the default value for the confirmation field 36 does not confirm receipt of the command 32. In one or more embodiments, for instance, the message 34 may include multiple different confirmation fields for respectively confirming receipt of commands with respect to operating configurations in different cells, i.e., the confirmation fields are cell-specific. In this case, any given confirmation field that is set to be different than the default value (e.g., 0) may confirm receipt of a command with respect to an operating configuration in a certain cell, whereas any given confirmation field that is set to the default value may not confirm receipt of a command with respect to an operating configuration in a certain cell.

Figure 8B:
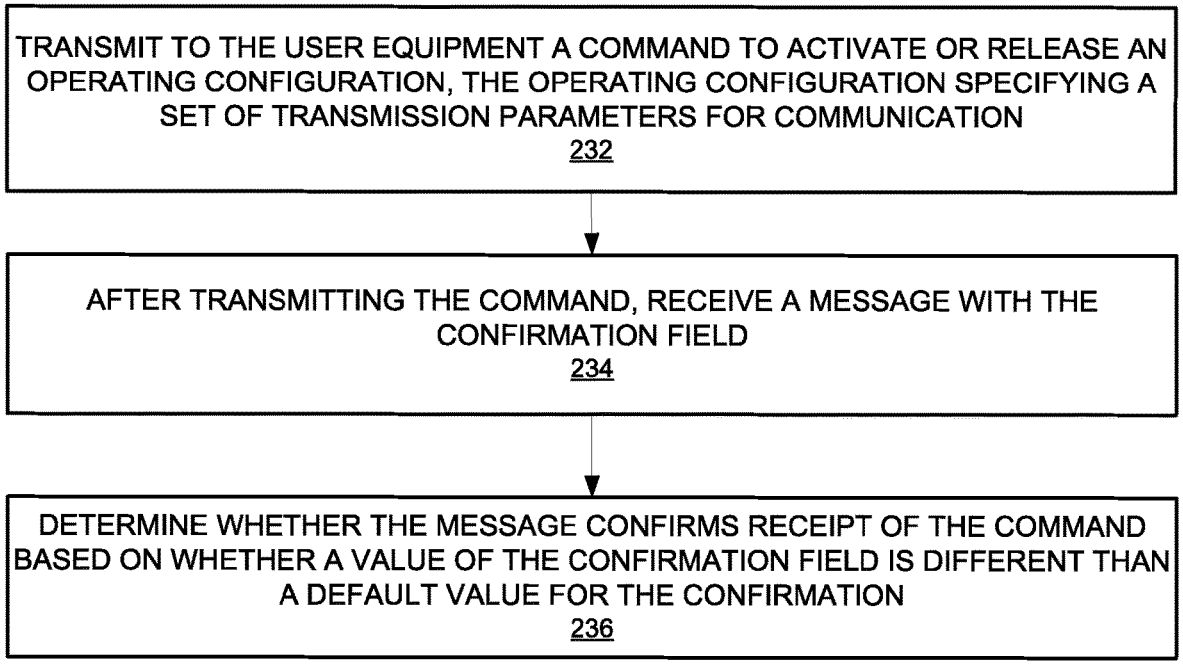
FIG. 8B is a logic flow diagram of a method performed by radio network equipment according to other embodiments.

FIG. 8B correspondingly shows a method performed by radio network equipment 24 configured for use in a wireless communication system 10. The method comprises transmitting to a user equipment 18 a command 32 to activate or release an operating configuration 20, the operating configuration 20 specifying a set of transmission parameters for communication (Block 232). The method also comprises, after transmitting the command 32, receiving a message 34 with a confirmation field 36 (Block 234). The method may further comprise determining whether the message 34 confirms receipt of the command 32 based on whether a value of the confirmation field 36 is different than a default value for the confirmation field 36 (Block 236). In some embodiments, for instance, the default value for the confirmation field 36 is '0'.

In some embodiments, a value of the confirmation field 36 that is different than the default value confirms receipt of the command 32, and the default value for the confirmation field 36 does not confirm receipt of the command 32. In one or more embodiments, for instance, the message 34 may include multiple different confirmation fields for respectively confirming receipt of commands with respect to operating configurations in different cells, i.e., the confirmation fields are cell-specific. In this case, any given confirmation field that is set to be different than the default value (e.g., 0) may confirm receipt of a command with respect to an operating configuration in a certain cell, whereas any given confirmation field that is set to the default value may not confirm receipt of a command with respect to an operating configuration in a certain cell.

FIG. 7C illustrates a method performed by a user equipment 18 according to still other embodiments. The method comprises receiving from radio network equipment 24 a command 32 with respect to an operating configuration 20 (Block 150). The operating configuration 20 specifies a set of transmission parameters for communication. The method also comprises confirming receipt of the command 32 by setting the value of a confirmation field 36 in a message 34 and transmitting the message 34 (Block 160). In some embodiments as shown, the confirmation field 36 is shared for confirming receipt of a number of different types of commands (or activation statuses) with respect to the operating configuration 20 that is greater than a number of possible values of the confirmation field 36.

In one embodiment, for instance, the command 32 is either an activate command, a release command, or a re-activate command. That is, the command 32 is either a first possible type which commands that a released operating configuration be activated, a second possible type which commands that an activated operating configuration be released, or a third possible type which commands that an activated operating configuration be re-activated with one or more different parameters. In this case, the confirmation field 36 may be shared for confirming receipt of any of the first, second, and third types of commands. Moreover, in these and other embodiments, the confirmation field 36 may be a single bit field, such that the possible values of the confirmation field 36 include a possible value of 1 and a possible value of 0. In this case, the confirmation filed 36 is shared for confirming receipt of 3 different types of commands (activate, release, and re-activate) with respect to the operating configuration 20, but the number of possible values of the confirmation field 36 is only 2 (namely, 1 and 0).

In another embodiment, the command 32 is either an activation command or a release command, but an activation command may cause the user equipment 18 to re-activate an already activated operating configuration, e.g., with a different set of transmission parameters for communication. In this sense, the activation status may be considered as "re-activated", as opposed to just "activated." In this case, the user equipment 18 may set the value of the confirmation field 36 in a way that enables the user equipment 18 to confirm receipt of an activation command that causes re-activation of an activated operating configuration, e.g., as distinguished from confirming receipt of an activation command that activated the operation configuration to begin with. That is, the user equipment 18 may set the value of the confirmation field 36 in a way that enables the user equipment 18 to confirm receipt of an activation command that changes an operating configuration's status to 're-activated' as distinguished from confirming receipt of an activation command that changes an operating configuration's status to 'activated'. In one embodiment, for instance, the user equipment 18 sets the value of the confirmation field 36 to be different than a default value in order to confirm receipt of any command, but sets the value of the confirmation field 36 to be the default value in order to not confirm receipt of any command.

In these and other embodiments, therefore, the confirmation field 36 may be shared for confirming receipt of any of 3 activation statuses: activated, released, or re-activated. Moreover, as described above, the confirmation field 36 may be a single bit field, such that the possible values of the confirmation field 36 include a possible value of 1 and a possible value of 0. In this case, the confirmation filed 36 is shared for confirming receipt of 3 different types of activation statuses (activated, released, and re-activated) with respect to the operating configuration 20, but the number of possible values of the confirmation field 36 is only 2 (namely, 1 and 0).

FIG. 8C correspondingly shows a method performed by radio network equipment 24 configured for use in a wireless communication system 10. The method comprises transmitting to a user equipment 18 a command 32 with respect to an operating configuration 20, the operating configuration 20 specifying a set of transmission parameters for communication (Block 238). The method also comprises, after transmitting the command 32, receiving a message 34 with a confirmation field 36 (Block 240). The method may further comprise determining whether the message 34 confirms receipt of the command 32 based on a value of the confirmation field 36 (Block 242). In some embodiments as shown, the confirmation field 36 is shared for confirming receipt of a number of different types of commands (or activation statuses) with respect to the operating configuration 20 that is greater than a number of possible values of the confirmation field 36. The confirmation field 36 may be defined for instance in any of the ways described above with respect to FIG. 7C.

FIG. 8D shows a method performed by radio network equipment 24 configured for use in a wireless communication system 10 in other embodiments. The method comprises transmitting to a user equipment 18 a command 32 to activate or release an uplink operating configuration 20, the operating configuration 20 specifying a set of transmission parameters for uplink communication (Block 244). The method also comprises determining whether or not the user equipment 18 received the command 32 based on whether or not uplink communication from the user equipment 18 uses the uplink operating configuration (Block 246).

In some embodiments, for example, the uplink operating configuration is a semi-persistent scheduling (SPS) configuration that specifies a set of periodic radio resources for uplink communication. In this case, such determination in Block 250 may entail determining whether or not the user equipment 18 received the command 32 based on whether or not the radio network equipment 24 receives uplink communication from the user equipment 18 on the set of periodic radio resources.

Note that the radio network equipment 24 as described above may perform the processing herein by implementing any functional means or units. In one embodiment, for example, the radio network equipment 24 comprises respective circuits configured to perform the steps shown in FIG. 8A, 8B, 8C or 8D. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the radio network equipment 24 contains instructions executable by the processing circuitry radio network equipment 24 is configured to carry out the processing herein.

Figure 9A:
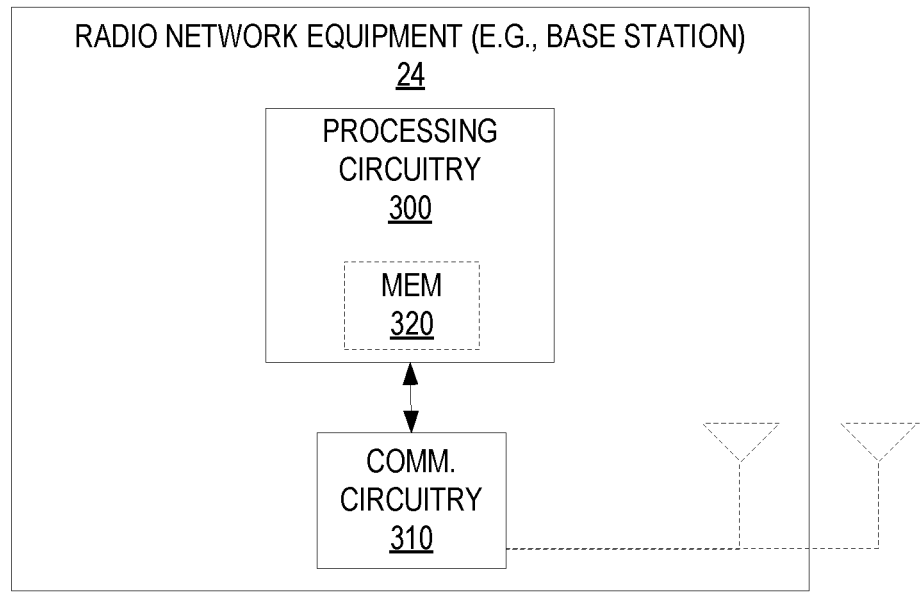
FIG. 9A is a block diagram of radio network equipment according to some embodiments.

FIG. 9A illustrates additional details of radio network equipment 24 in accordance with one or more embodiments. As shown, the radio network equipment 24 includes processing circuitry 300 and communication circuitry 310. The communication circuitry 310 is configured to communication with one or more other nodes, e.g., the user equipment 18 and/or a radio network node. The communication circuitry 310 in this regard may be configured to transmit and/or receive via one or more antennas that are external or internal to the radio network equipment 24. The processing circuitry 300 may be configured to perform processing described above, e.g., in FIG. 8A, 8B, 8C or 8D, such as by executing instructions stored in memory 320. The processing circuitry 300 in this regard may implement certain functional means or units.

Figure 9B:
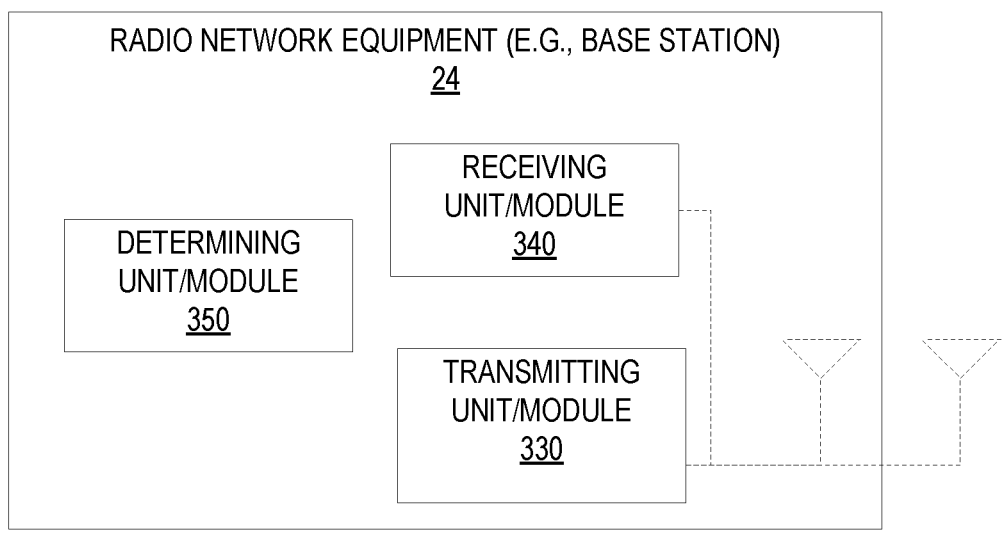
FIG. 9B is a block diagram of radio network equipment according to other embodiments.

FIG. 9B in this regard illustrates radio network equipment 24 in accordance with one or more other embodiments. As shown, the radio network equipment 24 implements various functional means, units, or modules, e.g., via the processing circuitry 300 in FIG. 9A and/or via software code. These functional means, units, or modules, e.g., for implementing the method in FIG. 8A, include for instance a transmitting unit or module 330 for transmitting to a user equipment 18 a command 32 to activate or release an operating configuration 20, the operating configuration specifying a set of transmission parameters for communication. Also shown as included is a receiving module or unit 340 for, after transmitting the command, receiving a message 34 with a confirmation field 36. Further shown as included is a determining unit or module 350 for determining whether the message 34 confirms receipt of the command 32 based on whether a value of the confirmation field 36 is different than a stored value for the confirmation field 36.

In other embodiments, e.g., for implementing the method in FIG. 8B, the determining unit or module 350 may be for determining whether the message 34 confirms receipt of the command 32 based on whether a value of the confirmation field 36 is different than a default value for the confirmation field 36.

In still other embodiments, e.g., for implementing the method in FIG. 8C, the transmitting unit or module 330 may be for transmitting to a user equipment 18 a command 32 with respect to an operating configuration 20, the operating configuration specifying a set of transmission parameters for communication. And the receiving module or unit 340 may be for, after transmitting the command, receiving a message 34 with a confirmation field 36. Furthermore, the determining unit or module 350 may be for determining whether the message 34 confirms receipt of the command 32 based on a value of the confirmation field 36. In some embodiments as shown, the confirmation field 36 is shared for confirming receipt of a number of different types of commands (or activation statuses) with respect to the operating configuration 20 that is greater than a number of possible values of the confirmation field 36.

Figure 9C:
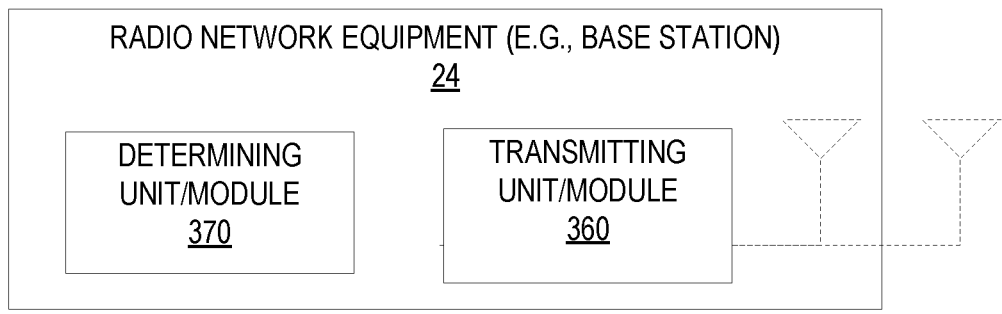
FIG. 9C is a block diagram of radio network equipment according to still other embodiments.

FIG. 9C illustrates radio network equipment 24 in accordance with one or more other embodiments. As shown, the radio network equipment 24 implements various functional means, units, or modules, e.g., via the processing circuitry 300 in FIG. 9A and/or via software code. These functional means, units, or modules, e.g., for implementing the method in FIG. 8B, include for instance a transmitting unit or module 360 for transmitting to a user equipment 18 a command 32 to activate or release an uplink operating configuration 20, the uplink operating configuration specifying a set of transmission parameters for uplink communication. Also shown as included is a determining unit or module 370 for determining whether or not the user equipment 18 received the command 32 based on whether or not uplink communication from the user equipment 18 uses the uplink operating configuration.

Figure 9D:
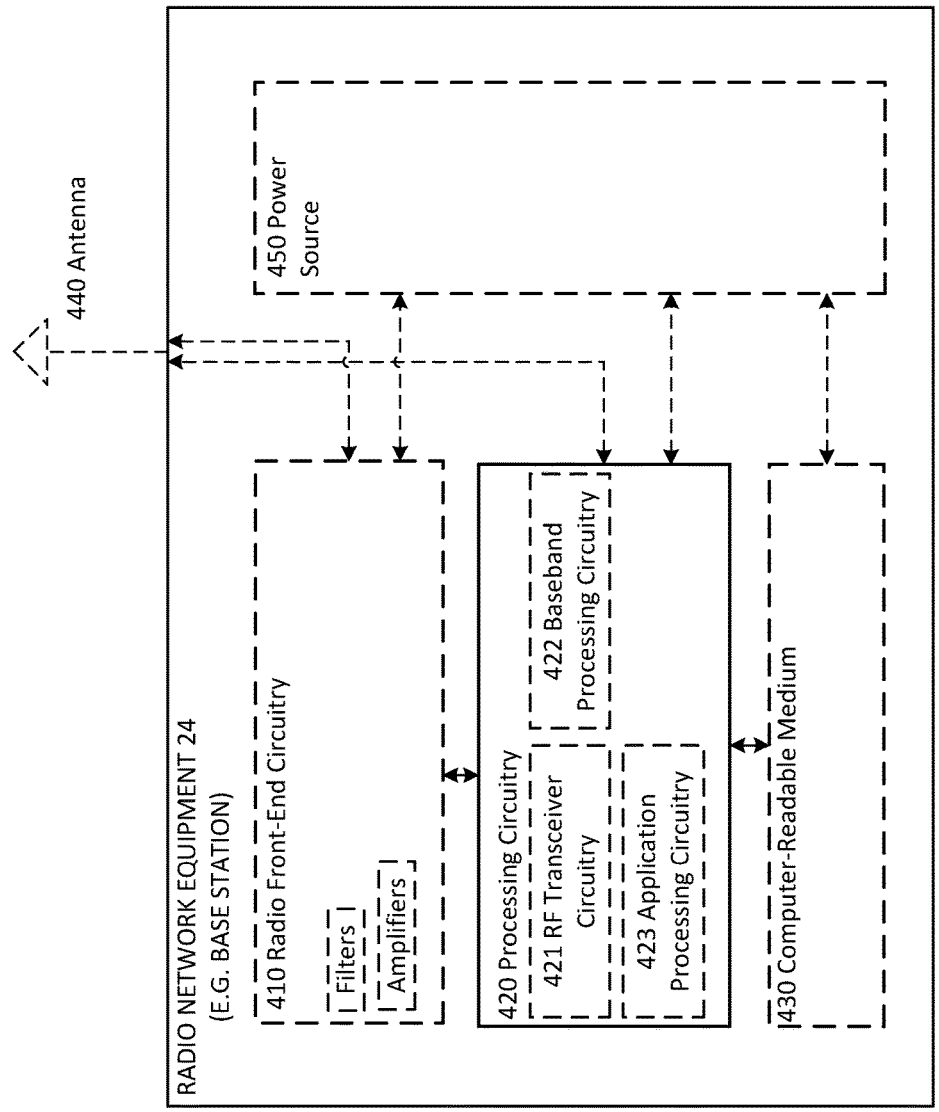
FIG. 9D is a block diagram of radio network equipment according to yet other embodiments.

Additional details of the radio network equipment 24 are shown in relation to FIG. 9D. As shown in 9D, the example radio network equipment 24 includes an antenna 440, radio circuitry (e.g. radio front-end circuitry) 410, processing circuitry 420, and the radio network equipment 24 may also include a memory 430. The memory 430 may be separate from the processing circuitry 420 or an integral part of processing circuitry 420. Antenna 440 may include one or more antennas or antenna arrays, and is configured to send and/or receive wireless signals, and is connected to radio circuitry (e.g. radio front-end circuitry) 410. In certain alternative embodiments, radio network equipment 24 may not include antenna 440, and antenna 440 may instead be separate from radio network equipment 24 and be connectable to radio network equipment 24 through an interface or port.

The radio circuitry (e.g. radio front-end circuitry) 410 may comprise various filters and amplifiers, is connected to antenna 440 and processing circuitry 420, and is configured to condition signals communicated between antenna 440 and processing circuitry 420. In certain alternative embodiments, radio network equipment 24 may not include radio circuitry (e.g. radio front-end circuitry) 410, and processing circuitry 420 may instead be connected to antenna 440 without front-end circuitry 410.

Processing circuitry 420 may include one or more of radio frequency (RF) transceiver circuitry, baseband processing circuitry, and application processing circuitry. In some embodiments, the RF transceiver circuitry 421, baseband processing circuitry 422, and application processing circuitry 423 may be on separate chipsets. In alternative embodiments, part or all of the baseband processing circuitry 422 and application processing circuitry 423 may be combined into one chipset, and the RF transceiver circuitry 421 may be on a separate chipset. In still alternative embodiments, part or all of the RF transceiver circuitry 421 and baseband processing circuitry 422 may be on the same chipset, and the application processing circuitry 423 may be on a separate chipset. In yet other alternative embodiments, part or all of the RF transceiver circuitry 421, baseband processing circuitry 422, and application processing circuitry 423 may be combined in the same chipset. Processing circuitry 420 may include, for example, one or more central processing units (CPUs), one or more microprocessors, one or more application specific integrated circuits (ASICs), and/or one or more field programmable gate arrays (FPGAs).

The radio network equipment 24 may include a power source 450. The power source 450 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 410, processing circuitry 420, and/or memory 430. The power source 450, battery, power supply circuitry, and/or power management circuitry are configured to supply radio network equipment 24, including processing circuitry 420, with power for performing the functionality described herein.

Also, the user equipment 18 may perform the processing herein by implementing any functional means or units. In one embodiment, for example, the user equipment 18 comprises respective circuits configured to perform the steps shown in any of FIG. 7A, 7B, or 7C. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the user equipment 18 contains instructions executable by the processing circuitry whereby the user equipment 18 is configured to carry out the processing herein.

Figure 10A:
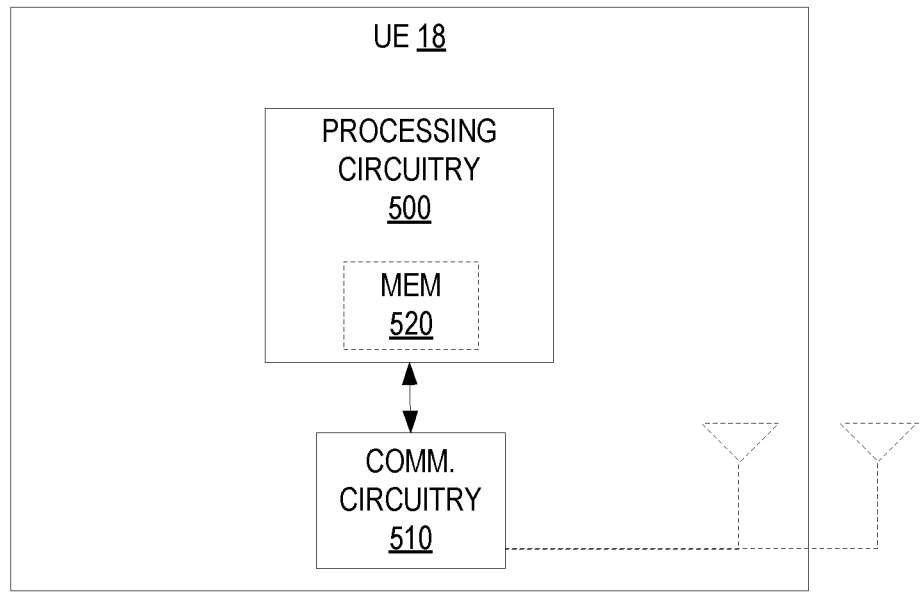
FIG. 10A is a block diagram of a user equipment according to some embodiments.

FIG. 10A illustrates additional details of a user equipment 18 in accordance with one or more embodiments. As shown, the user equipment 18 includes processing circuitry 500 and communication circuitry 510 (e.g., one or more radio circuits). The communication circuitry 510 may be configured to transmit via one or more antennas that are external or internal to the user equipment 18.

Although not shown, the user equipment 18 in some embodiments may further comprise an input interface connected to the processing circuitry 500 and configured to allow input of information into the UE 18 to be processed by the processing circuitry 500, and an output interface connected to the processing circuitry 500 and configured to output information from the UE 18 that has been processed by the processing circuitry 500. Yet further, the user equipment 18 may comprises a battery connected to the processing circuitry 500 and configured to supply power to the UE 18.

In any event, the processing circuitry 500 in FIG. 10A is configured to perform processing described above, e.g., in FIG. 7A, 7B, or 7C, such as by executing instructions stored in memory 520. The processing circuitry 500 in this regard may implement certain functional means or units.

Figure 10B:
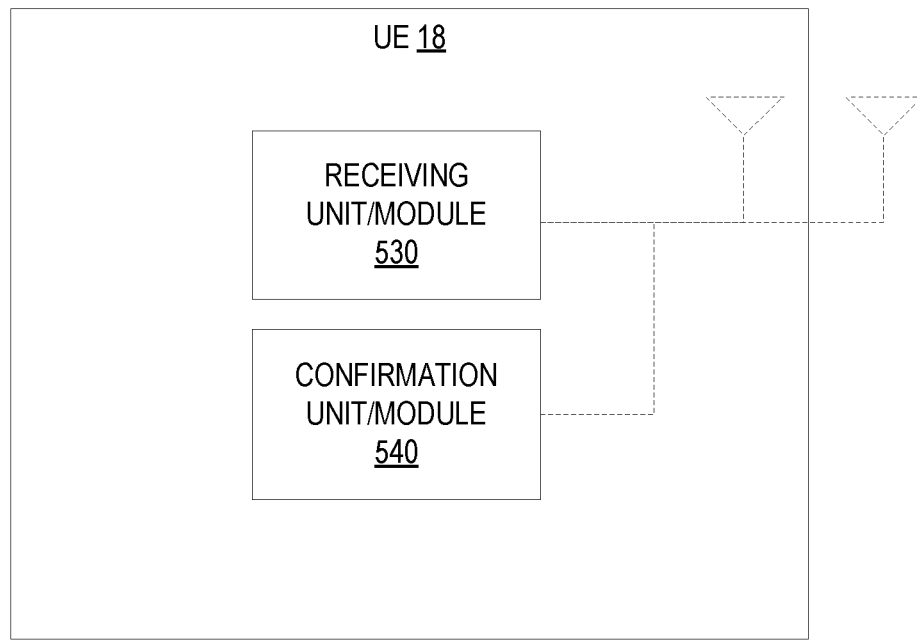
FIG. 10B is a block diagram of a user equipment according to other embodiments.
Figure 10C:
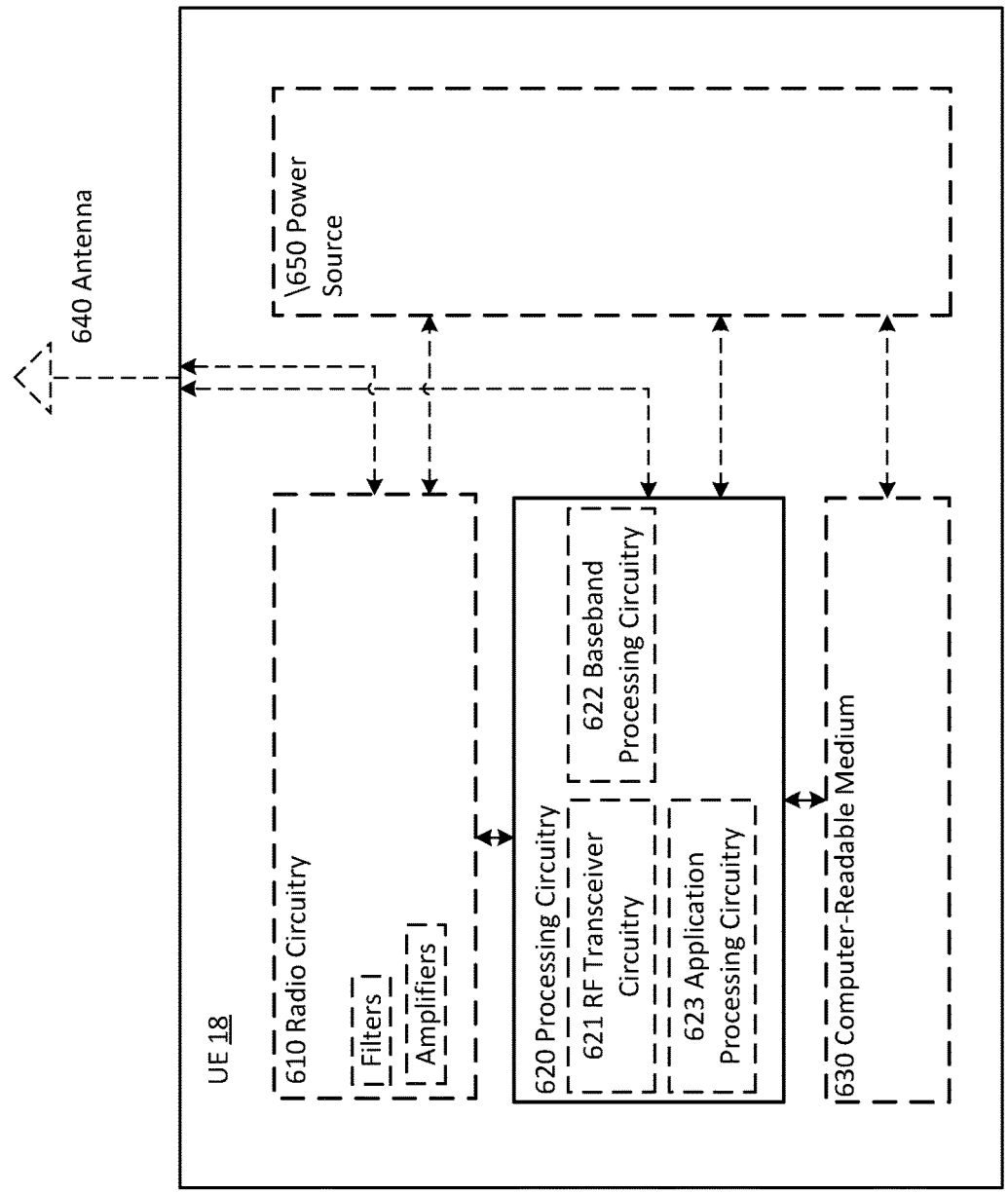
FIG. 10C is a block diagram of a user equipment according to still other embodiments.

FIG. 10B in this regard illustrates additional details of a user equipment 18 in accordance with one or more other embodiments, e.g., for implementing the method in FIG. 7A. As shown, the user equipment 18 may include a receiving unit or module 530 for receiving from radio network equipment 24 a command 32 to activate or release an operating configuration 20, the operating configuration 20 specifying a set of transmission parameters for communication. Also shown as included is a confirmation unit or module 540 for confirming receipt of the command 32 by setting the value of a confirmation field 36 in a message 34 to be different than a stored value for the confirmation field 36 and transmitting the message 34.

In other embodiments, e.g., for the user equipment 18 to implement the method in FIG. 7B, the confirmation unit or module 540 may be for confirming receipt of the command 32 by setting the value of a confirmation field 36 in a message 34 to be different than a default value for the confirmation field 36 and transmitting the message 34.

In still other embodiments, e.g., for the user equipment 18 to implement the method in FIG. 7C, the receiving unit or module 530 may be for receiving from radio network equipment 24 a command 32 with respect to an operating configuration 20, the operating configuration 20 specifying a set of transmission parameters for communication. And the confirmation unit or module 540 may be for confirming receipt of the command 32 by setting the value of a confirmation field 36 in a message 34 and transmitting the message 34. In some embodiments, the confirmation field 36 in this case may be shared for confirming receipt of a number of different types of commands (or activation statuses) with respect to the operating configuration 20 that is greater than a number of possible values of the confirmation field 36.

Additional details of a user equipment 18 according to some embodiments are shown in relation to FIG. 10O. As shown in 10O, the example user equipment 18 includes an antenna 640, radio circuitry (e.g. radio front-end circuitry) 610, processing circuitry 620, and the user equipment 14 may also include a memory 630. The memory 630 may be separate from the processing circuitry 620 or an integral part of processing circuitry 620. Antenna 640 may include one or more antennas or antenna arrays, and is configured to send and/or receive wireless signals, and is connected to radio circuitry (e.g. radio front-end circuitry) 610. In certain alternative embodiments, user equipment 18 may not include antenna 6, and antenna 640 may instead be separate from user equipment 18 and be connectable to user equipment 18 through an interface or port.

The radio circuitry (e.g. radio front-end circuitry) 610 may comprise various filters and amplifiers, is connected to antenna 640 and processing circuitry 620, and is configured to condition signals communicated between antenna 640 and processing circuitry 620. In certain alternative embodiments, user equipment 18 may not include radio circuitry (e.g. radio front-end circuitry) 610, and processing circuitry 620 may instead be connected to antenna 640 without front-end circuitry 610.

Processing circuitry 620 may include one or more of radio frequency (RF) transceiver circuitry, baseband processing circuitry, and application processing circuitry. In some embodiments, the RF transceiver circuitry 621, baseband processing circuitry 622, and application processing circuitry 623 may be on separate chipsets. In alternative embodiments, part or all of the baseband processing circuitry 622 and application processing circuitry 623 may be combined into one chipset, and the RF transceiver circuitry 621 may be on a separate chipset. In still alternative embodiments, part or all of the RF transceiver circuitry 621 and baseband processing circuitry 622 may be on the same chipset, and the application processing circuitry 623 may be on a separate chipset. In yet other alternative embodiments, part or all of the RF transceiver circuitry 621, baseband processing circuitry 622, and application processing circuitry 623 may be combined in the same chipset. Processing circuitry 620 may include, for example, one or more central processing units (CPUs), one or more microprocessors, one or more application specific integrated circuits (ASICs), and/or one or more field programmable gate arrays (FPGAs).

The user equipment 18 may include a power source 650. The power source 650 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 610, processing circuitry 620, and/or memory 630. The power source 650, battery, power supply circuitry, and/or power management circuitry are configured to supply user equipment 18, including processing circuitry 620, with power for performing the functionality described herein.

Alternative embodiments of the user equipment 18 may include additional components beyond those shown in the figures that may be responsible for providing certain aspects of the UE's functionality, including any of the functionality described herein and/or any functionality necessary to support the solution described above. As just one example, user equipment 18 may include input interfaces, devices and circuits, and output interfaces, devices and circuits. Input interfaces, devices, and circuits are configured to allow input of information into user equipment 18, and are connected to processing circuitry to allow processing circuitry to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from user equipment 18, and are connected to processing circuitry to allow processing circuitry to output information from user equipment 18. For example, output interfaces, devices, or circuits may include a speaker, a display, vibrating circuitry, a USB port, a headphone interface, or other output elements. Using one or more input and output interfaces, devices, and circuits, user equipment 18 may communicate with end users and/or the wireless network, and allow them to benefit from the functionality described herein.

Those skilled in the art will also appreciate that embodiments herein further include corresponding computer programs.

A computer program comprises instructions which, when executed on at least one processor of a user equipment 18, cause the user equipment 18 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In other embodiments, a computer program comprises instructions which, when executed on at least one processor of radio network equipment 24, cause the radio network equipment 24 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Some embodiments herein may also be enumerated as indicated below.

Embodiment 1

A method performed by a user equipment configured for use in a wireless communication system, the method comprising: receiving from radio network equipment a command to activate or release an operating configuration, the operating configuration specifying a set of transmission parameters for communication; and confirming receipt of the command by setting the value of a confirmation field in a message to be different than a stored value for the confirmation field and transmitting the message.

Embodiment 2

The method of embodiment 1, wherein the stored value for the confirmation field is a value to which the confirmation field was set in a message last transmitted for confirming receipt of a last received command.

Embodiment 3

The method of any of embodiments 1-2, further comprising, before receiving the command: receiving a previous command to activate or release the same operating configuration or a different operating configuration; confirming receipt of the previous command by transmitting a previous message with the confirmation field set to a certain value; and storing the certain value as the stored value for the confirmation field.

Embodiment 4

The method of embodiment 1, wherein the stored value for the confirmation field is an initial value.

Embodiment 5

The method of any of embodiments 1-4, wherein the confirmation field is shared for confirming receipt of any command to activate or release any of multiple operating configurations in a certain cell, with the stored value for the confirmation field indicating the value of the confirmation field as last signaled for confirming receipt of a command to activate or release any operating configuration in the certain cell.

Embodiment 6

The method of any of embodiments 1-5, wherein the confirmation field is specific to a certain cell.

Embodiment 7

The method of any of embodiments 1-6, wherein the message includes multiple different confirmation fields that are respectively dedicated for confirming receipt of commands to active or release operating configurations in different cells, wherein the received command is a command to activate or release an operating configuration in a certain one of the cells, and the confirmation field whose value is set for confirming receipt of the command is the confirmation field dedicated for the certain cell.

Embodiment 8

The method of any of embodiments 1-4, wherein the operating configuration has a certain configuration index, wherein the confirmation field is shared for confirming receipt of any command to activate or release an operating configuration with the certain configuration index in any of multiple cells, with the stored value for the confirmation field indicating the value of the confirmation field as last signaled for confirming receipt of a command to activate or release an operating configuration with the certain configuration index in any of the multiple cells.

Embodiment 9

The method of any of embodiments 1-4 and 8, wherein the confirmation field is specific to a certain configuration index of the operating configuration.

Embodiment 10

The method of any of embodiments 1-4 and 8-9, wherein the message includes multiple different confirmation fields that are respectively dedicated for confirming receipt of commands to activate or release operating configurations with different configuration indices, wherein the received command is a command to activate or release an operating configuration with a certain configuration index, and the confirmation field whose value is set for confirming receipt of the command is the confirmation field dedicated for the certain configuration index.

Embodiment 11

The method of any of embodiments 1-10, further comprising determining to set the value of the confirmation field in the message to be different than the stored value for the confirmation field, when either: the operating condition is released and the command is to active the released operating condition; or the operating condition is activated and the command is to release the activated operating condition.

Embodiment 12

The method of any of embodiments 1-4, wherein the confirmation field is specific to a certain cell and a certain configuration index of the operating configuration.

Embodiment 13

The method of any of embodiments 1-12, wherein the message includes a set of multiple confirmation fields that is associated with a group of cells, wherein different possible sets of confirmation fields for the message are associated with different groups of cells.

Embodiment 14

The method of any of embodiments 1-13, wherein the operating configuration is a semi-persistent scheduling (SPS) configuration that specifies a set of periodic radio resources for communication.

Embodiment 15

The method of any of embodiments 1-14, wherein the command is either a first possible type which commands that a released operating configuration be activated, a second possible type which commands that an activated operating configuration be released, or a third possible type which commands that an activated operating configuration be re-activated with one or more different parameters.

Embodiment 16

The method of embodiment 15, wherein the confirmation field is shared for confirming receipt of any of the first, second, and third types of commands.

Embodiment 17

The method of any of embodiments 15-16, wherein different possible values of the confirmation field are decoupled from the different possible types of commands, such that a certain value of the confirmation field does not confirm receipt of a certain type of command.

Embodiment 18

The method of any of embodiments 1-16, wherein different possible values of the confirmation field are decoupled from an activation status of the operating configuration, such that a certain value of the confirmation field does not indicate a certain activation status of the operating configuration.

Embodiment 19

The method of any of embodiments 1-18, comprising setting the value of the confirmation field to be different than the stored value for the confirmation field irrespective of a type of the command or irrespective of an activation status of the operating configuration.

Embodiment 20

The method of any of embodiments 1-19, wherein the confirmation field is a single bit field.

Embodiment 21

A method performed by radio network equipment configured for use in a wireless communication system, the method comprising: transmitting to a user equipment a command to activate or release an operating configuration, the operating configuration specifying a set of transmission parameters for communication; after transmitting the command, receiving a message with a confirmation field; and determining whether the message confirms receipt of the command based on whether a value of the confirmation field is different than a stored value for the confirmation field.

Embodiment 22

The method of embodiment 21, wherein the stored value for the confirmation field is a value to which the confirmation field was set in a message last received for confirming receipt of a last transmitted command.

Embodiment 23

The method of any of embodiments 21-22, further comprising, before transmitting the command:
transmitting to the user equipment a previous command to active or release the same operating configuration or a different operating configuration;
after transmitting the previous command, receiving a previous message with the confirmation field set to a certain value; and
storing the certain value as the stored value for the confirmation field.

Embodiment 24

The method of embodiment 21, wherein the stored value for the confirmation field is an initial value.

Embodiment 25

The method of any of embodiments 21-24, wherein the confirmation field is shared for confirming receipt of any command to activate or release any of multiple operating configurations in a certain cell, with the stored value for the confirmation field indicating the value of the confirmation field as last signaled for confirming receipt of a command to activate or release any operating configuration in the certain cell.

Embodiment 26

The method of any of embodiments 21-25, wherein the confirmation field is specific to a certain cell.

Embodiment 27

The method of any of embodiments 21-26, wherein the message includes multiple different confirmation fields that are respectively dedicated for confirming receipt of commands to active or release operating configurations in different cells, wherein the transmitted command is a command to activate or release an operating configuration in a certain one of the cells, and the confirmation field whose value is set for confirming receipt of the command is the confirmation field dedicated for the certain cell.

Embodiment 28

The method of any of embodiments 21-24, wherein the operating configuration has a certain configuration index, wherein the confirmation field is shared for confirming receipt of any command to activate or release an operating configuration with the certain configuration index in any of multiple cells, with the stored value for the confirmation field indicating the value of the confirmation field as last signaled for confirming receipt of a command to activate or release an operating configuration with the certain configuration index in any of the multiple cells.

Embodiment 29

The method of any of embodiments 21-24 and 28, wherein the confirmation field is specific to a certain configuration index of the operating configuration.

Embodiment 30

The method of any of embodiments 21-24 and 28-29, wherein the message includes multiple different confirmation fields that are respectively dedicated for confirming receipt of commands to activate or release operating configurations with different configuration indices, wherein the transmitted command is a command to activate or release an operating configuration with a certain configuration index, and the confirmation field whose value is set for confirming receipt of the command is the confirmation field dedicated for the certain configuration index.

Embodiment 31

The method of any of embodiments 21-24, wherein the confirmation field is specific to a certain cell and a certain configuration index of the operating configuration.

Embodiment 32

The method of any of embodiments 21-31, wherein the message includes a set of multiple confirmation fields that is associated with a group of cells, wherein different possible sets of confirmation fields for the message are associated with different groups of cells.

Embodiment 33

The method of any of embodiments 21-32, wherein the operating configuration is a semi-persistent scheduling (SPS) configuration that specifies a set of periodic radio resources for communication.

Embodiment 34

The method of any of embodiments 21-33, wherein the command is either a first possible type which commands that a released operating configuration be activated, a second possible type which commands that an activated operating configuration be released, or a third possible type which commands that an activated operating configuration be re-activated with one or more different parameters.

Embodiment 35

The method of embodiment 34, wherein the confirmation field is shared for confirming receipt of any of the first, second, and third types of commands.

Embodiment 36

The method of any of embodiments 34-35, wherein different possible values of the confirmation field are decoupled from the different possible types of commands, such that a certain value of the confirmation field does not confirm receipt of a certain type of command.

Embodiment 37

The method of any of embodiments 21-35, wherein different possible values of the confirmation field are decoupled from an activation status of the operating configuration, such that a certain value of the confirmation field does not indicate a certain activation status of the operating configuration.

Embodiment 38

The method of any of embodiments 21-37, comprising determining whether the message confirms receipt of the command based on whether a value of the confirmation field is different than a stored value for the confirmation, irrespective of a type of the command or irrespective of an activation status of the operating configuration.

Embodiment 39

The method of any of embodiments 21-38, wherein the confirmation field is a single bit field.

Embodiment 40

A method performed by radio network equipment configured for use in a wireless communication system, the method comprising: transmitting to a user equipment a command to activate or release an uplink operating configuration, the uplink operating configuration specifying a set of transmission parameters for uplink communication; and determining whether or not the user equipment received the command based on whether or not uplink communication from the user equipment uses the uplink operating configuration.\

Embodiment 41

The method of embodiment 40, wherein the uplink operating configuration is a semi-persistent scheduling (SPS) configuration that specifies a set of periodic radio resources for uplink communication, and wherein said determining comprises determining whether or not the user equipment received the command based on whether or not the radio network equipment receives uplink communication from the user equipment on the set of periodic radio resources.

Embodiment 42

A user equipment configured for use in a wireless communication system, the user equipment configured to: receive from radio network equipment a command to activate or release an operating configuration, the operating configuration specifying a set of transmission parameters for communication; and confirm receipt of the command by setting the value of a confirmation field in a message to be different than a stored value for the confirmation field and transmitting the message.

Embodiment 43

The user equipment of embodiment 42, configured to perform the method of any of embodiments 2-20.

Embodiment 44

A user equipment configured for use in a wireless communication system, the user equipment comprising: processing circuitry and a memory, the memory containing instructions executable by the processing circuitry whereby the user equipment is configured to: receive from radio network equipment a command to activate or release an operating configuration, the operating configuration specifying a set of transmission parameters for communication; and confirm receipt of the command by setting the value of a confirmation field in a message to be different than a stored value for the confirmation field and transmitting the message.

Embodiment 45

The user equipment of embodiment 44, the memory containing instructions executable by the processing circuitry whereby the user equipment is configured to perform the method of any of embodiments 2-20.

Embodiment 46

A user equipment configured for use in a wireless communication system, the user equipment comprising: a receiving module for receiving from radio network equipment a command to activate or release an operating configuration, the operating configuration specifying a set of transmission parameters for communication; and a confirming module for confirming receipt of the command by setting the value of a confirmation field in a message to be different than a stored value for the confirmation field and transmitting the message.

Embodiment 47

The user equipment of embodiment 46, comprising one or more modules for performing the method of any of embodiments 2-20.

Embodiment 48

A computer program comprising instructions which, when executed by at least one processor of user equipment, causes the user equipment to carry out the method of any of embodiments 1-20.

Embodiment 49

A carrier containing the computer program of embodiment 48, wherein the carrier is one of an electronic signal, optical signal, radio signal, or computer readable storage medium.

Embodiment 50

Radio network equipment configured for use in a wireless communication system, the radio network equipment configured to: transmit to a user equipment a command to activate or release an operating configuration, the operating configuration specifying a set of transmission parameters for communication; after transmitting the command, receive a message with a confirmation field; and determine whether the message confirms receipt of the command based on whether a value of the confirmation field is different than a stored value for the confirmation field.

Embodiment 51

The radio network equipment of embodiment 50, configured to perform the method of any of embodiments 22-39.

Embodiment 52

Radio network equipment configured for use in a wireless communication system, the radio network equipment comprising: processing circuitry and a memory, the memory containing instructions executable by the processing circuitry whereby the radio network equipment is configured to: transmit to a user equipment a command to activate or release an operating configuration, the operating configuration specifying a set of transmission parameters for communication; after transmitting the command, receive a message with a confirmation field; and determine whether the message confirms receipt of the command based on whether a value of the confirmation field is different than a stored value for the confirmation field.

Embodiment 53

The radio network equipment of embodiment 52, the memory containing instructions executable by the processing circuitry whereby the radio network equipment is configured to perform the method of any of embodiments 22-39.

Embodiment 54

Radio network equipment configured for use in a wireless communication system, the radio network equipment comprising: a transmitting module for transmitting to a user equipment a command to activate or release an operating configuration, the operating configuration specifying a set of transmission parameters for communication; a receiving module for, after transmitting the command, receiving a message with a confirmation field; and a determining module for determining whether the message confirms receipt of the command based on whether a value of the confirmation field is different than a stored value for the confirmation field.

Embodiment 55

The radio network equipment of embodiment 54, comprising one or more modules for performing the method of any of embodiments 22-39.

Embodiment 56

Radio network equipment configured for use in a wireless communication system, the radio network equipment configured to: transmit to a user equipment a command to activate or release an uplink operating configuration, the uplink operating configuration specifying a set of transmission parameters for uplink communication; and determine whether or not the user equipment received the command based on whether or not uplink communication from the user equipment uses the uplink operating configuration.

Embodiment 57

The radio network equipment of embodiment 56, wherein the uplink operating configuration is a semi-persistent scheduling (SPS) configuration that specifies a set of periodic radio resources for uplink communication, and wherein the radio network equipment is configured to determine whether or not the user equipment received the command based on whether or not the radio network equipment receives uplink communication from the user equipment on the set of periodic radio resources.

Embodiment 58

Radio network equipment configured for use in a wireless communication system, the radio network equipment comprising: processing circuitry and a memory, the memory containing instructions executable by the processing circuitry whereby the radio network equipment is configured to: transmit to a user equipment a command to activate or release an uplink operating configuration, the uplink operating configuration specifying a set of transmission parameters for uplink communication; and determine whether or not the user equipment received the command based on whether or not uplink communication from the user equipment uses the uplink operating configuration.

Embodiment 59

The radio network equipment of embodiment 56, wherein the uplink operating configuration is a semi-persistent scheduling (SPS) configuration that specifies a set of periodic radio resources for uplink communication, and wherein the memory contains instructions executable by the processing circuitry whereby the radio network equipment is configured to determine whether or not the user equipment received the command based on whether or not the radio network equipment receives uplink communication from the user equipment on the set of periodic radio resources.

Embodiment 60

Radio network equipment configured for use in a wireless communication system, the radio network equipment comprising: a transmitting module for transmitting to a user equipment a command to activate or release an uplink operating configuration, the uplink operating configuration specifying a set of transmission parameters for uplink communication; and a determining module for determining whether or not the user equipment received the command based on whether or not uplink communication from the user equipment uses the uplink operating configuration.

Embodiment 61

The radio network equipment of embodiment 56, wherein the uplink operating configuration is a semi-persistent scheduling (SPS) configuration that specifies a set of periodic radio resources for uplink communication, and wherein the determining module is for determining whether or not the user equipment received the command based on whether or not the radio network equipment receives uplink communication from the user equipment on the set of periodic radio resources.

Embodiment 62

A computer program comprising instructions which, when executed by at least one processor of radio network equipment, causes the radio network equipment to carry out the method of any of embodiments 21-41.

Embodiment 63

A carrier containing the computer program of embodiment 62, wherein the carrier is one of an electronic signal, optical signal, radio signal, or computer readable storage medium.

The example aspects of the disclosure presented below may be included in and/or may add features to one or more embodiments presented in the disclosure above.

Figure 11:
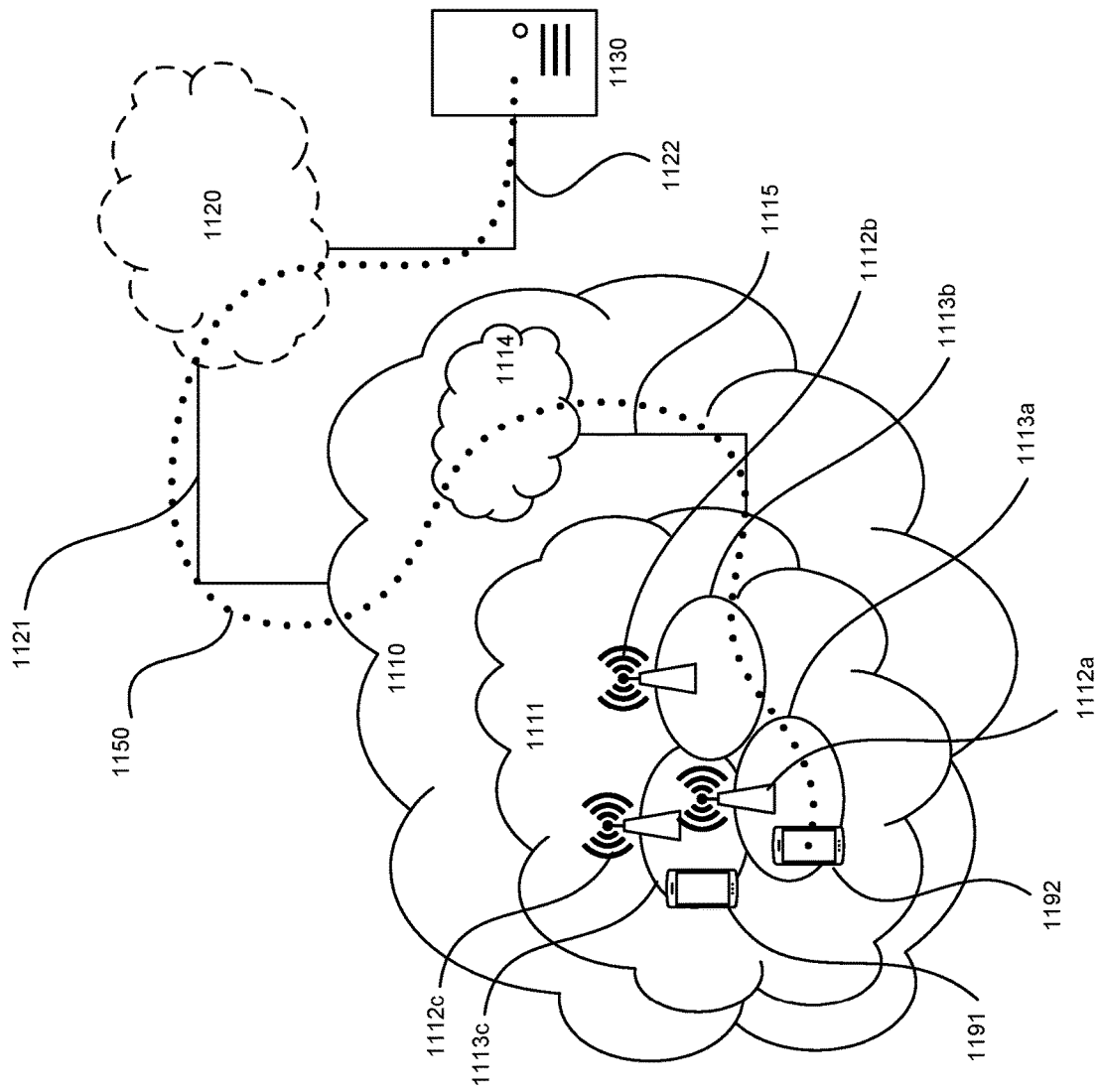
FIG. 11 is a block diagram of a telecommunication network connected via an intermediate network to a host computer according to some embodiments.

FIG. 11 schematically illustrates a telecommunication network connected via an intermediate network to a host computer.

With reference to FIG. 11, in accordance with an embodiment, a communication system includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs, eNBs, gNBs or other types of wireless access points, each defining a corresponding coverage area 1113a, 1113b, 1113c. In an aspect, any of base stations 1112a, 1112b, 1112c, or any other base stations described herein may be considered to be a network node, for instance, if such as network node is described above in the present Application. Each base station 1112a, 1112b, 1112c is connectable to the core network 1114 over a wired or wireless connection 1115. A first user equipment (UE) 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112. In an aspect, any of these UEs, or any other UE described herein may be considered to be configured to perform the aspects of any UE, user terminal, client device, or mobile device described above in the present Application.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Figure 12:
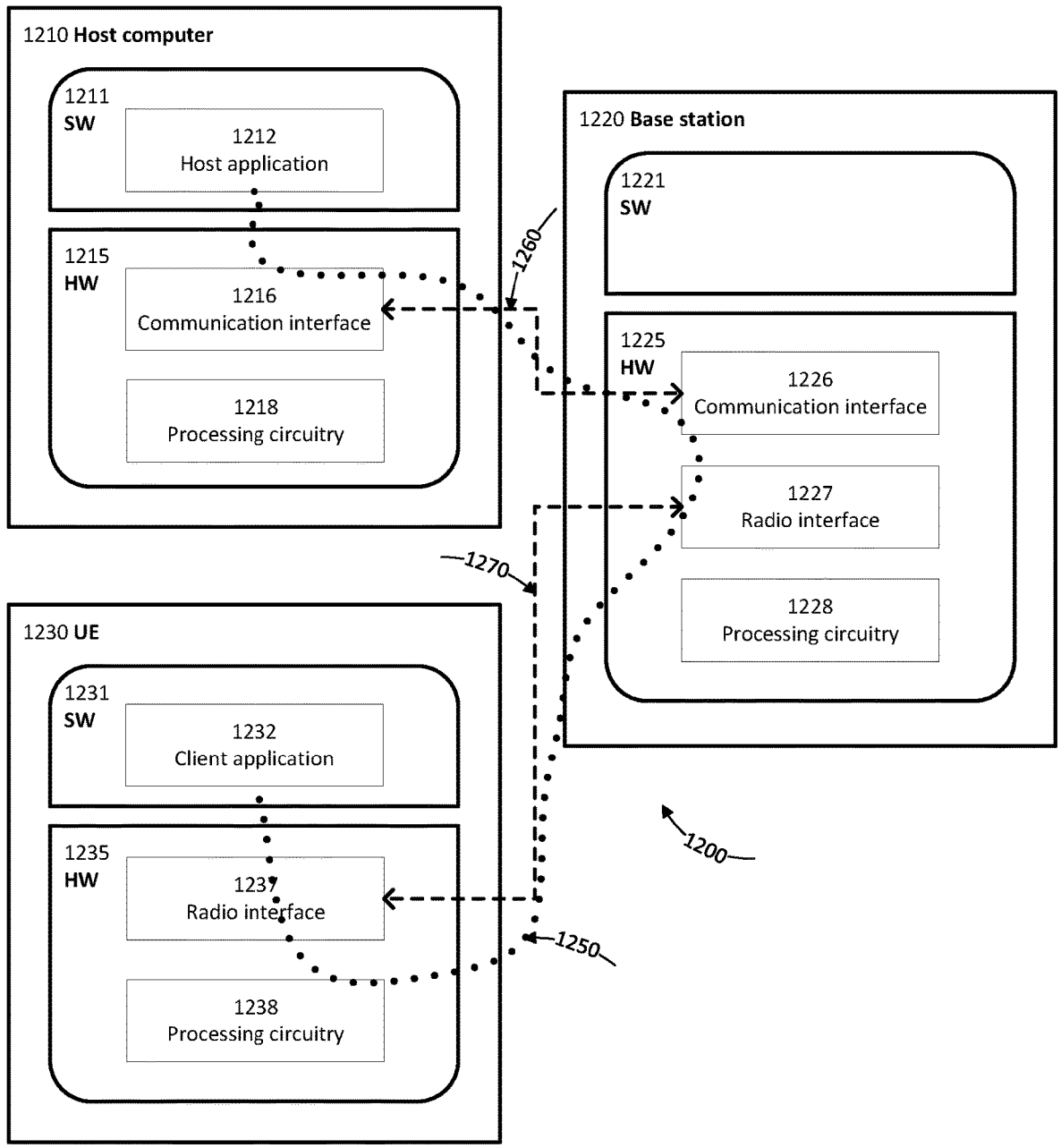
FIG. 12 is a block diagram of a host computer communicating via a base station with a user equipment over a partially wireless connection according to some embodiments.

Example implementations, in accordance with an embodiment, of the UE, base station and host computer discussed in the preceding paragraphs will now be described with reference to FIG. 12. FIG. 12 is a generalized block diagram of a host computer communicating via a base station with a user equipment over a partially wireless connection.

In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230, which has already been referred to above. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238.

The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

It is noted that the host computer 1210, base station 1220 and UE 1230 illustrated in FIG. 12 may be identical to the host computer 1130, one of the base stations 1112a, 1112b, 1112c and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the use equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments can improve one or more of data rate, latency, and/or power consumption associated with one or more devices and/or communications of/performed in communication system 1200, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both.

In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220.

Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or 'dummy' messages, using the OTT connection 1250 while it monitors propagation times, errors etc.

FIGS. 13, 14, 15, and 16 are flowcharts illustrating methods implemented in a communication system including a host computer, a base station and a user equipment.

Figure 13:
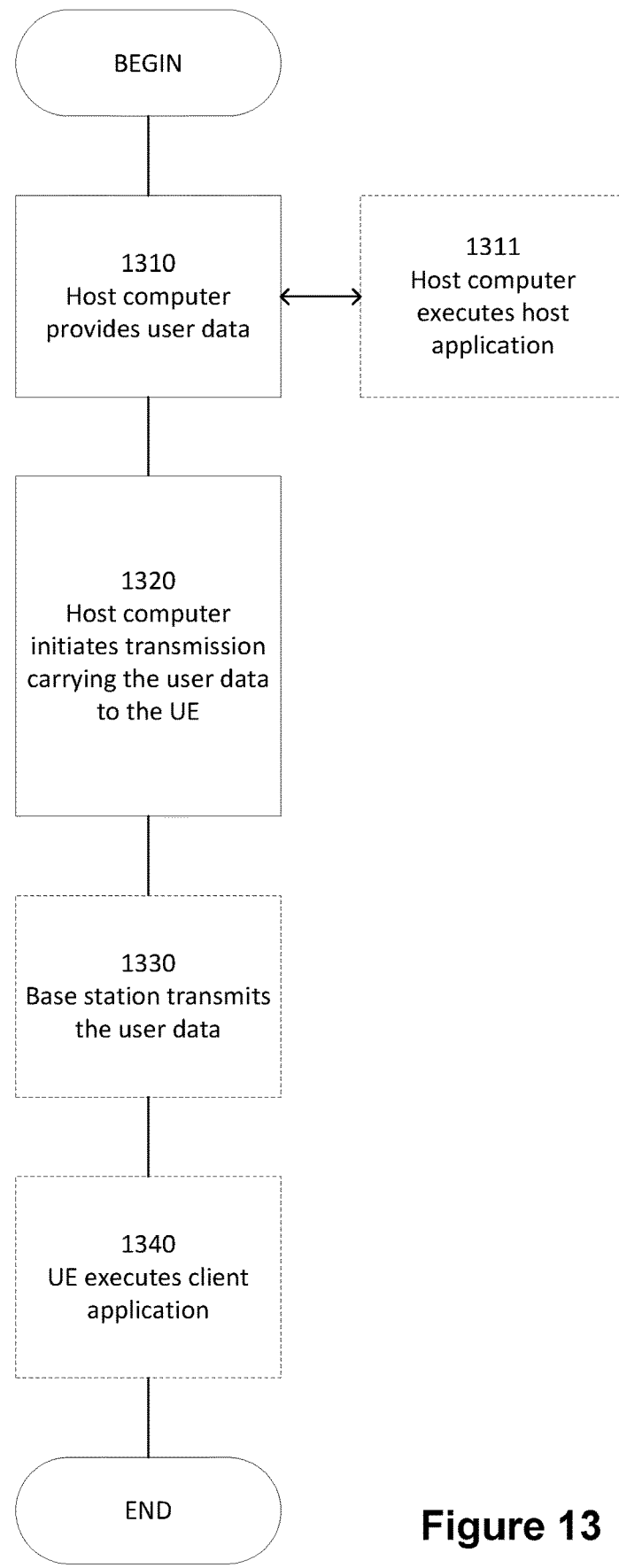
FIG. 13 is a flowchart illustrating a method implemented in a communication system, in accordance with one embodiment.

FIG. 13 is a flowchart illustrating a method implemented in a communication system, in accordance with one embodiment.

The communication system includes a host computer, a base station and a UE which may be those described with reference to FIGS. 11 and 12. For simplicity of the present disclosure, only drawing references to FIG. 13 will be included in this section. In a first step 1310 of the method, the host computer provides user data.

In an optional substep 1311 of the first step 1310, the host computer provides the user data by executing a host application. In a second step 1320, the host computer initiates a transmission carrying the user data to the UE.

In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

Figure 14:
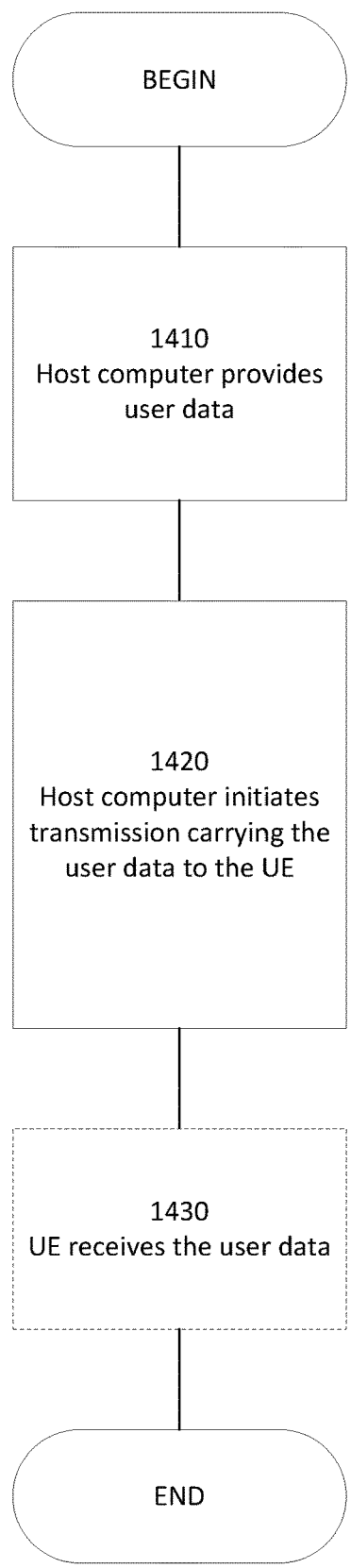
FIG. 14 is a flowchart illustrating a method implemented in a communication system, in accordance with one embodiment.

FIG. 14 is a flowchart illustrating a method implemented in a communication system, in accordance with one embodiment.

The communication system includes a host computer, a base station and a UE which may be those described with reference to FIGS. 11 and 12. For simplicity of the present disclosure, only drawing references to FIG. 14 will be included in this section. In a first step 1410 of the method, the host computer provides user data.

In an optional substep (not shown) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

Figure 15:
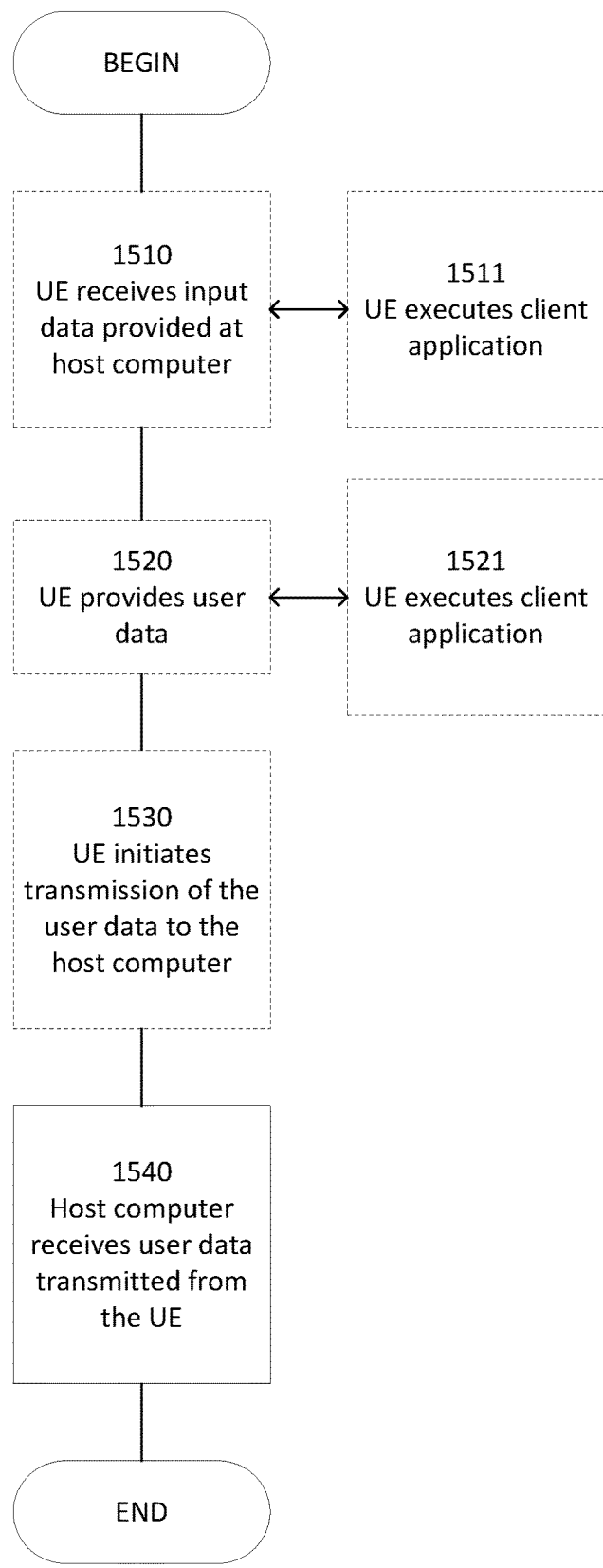
FIG. 15 is a flowchart illustrating a method implemented in a communication system, in accordance with one embodiment.

FIG. 15 is a flowchart illustrating a method implemented in a communication system, in accordance with one embodiment.

The communication system includes a host computer, a base station and a UE which may be those described with reference to FIGS. 11 and 12. For simplicity of the present disclosure, only drawing references to FIG. 15 will be included in this section. In an optional first step 1510 of the method, the UE receives input data provided by the host computer. Additionally or alternatively, in an optional second step 1520, the UE provides user data. In an optional substep 1521 of the second step 1520, the UE provides the user data by executing a client application. In a further optional substep 1511 of the first step 1510, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1530, transmission of the user data to the host computer. In a fourth step 1540 of the method, the host computer receives the user data transmitted from the UE, in accordance with the teachings of the embodiments described throughout this disclosure.

Figure 16:
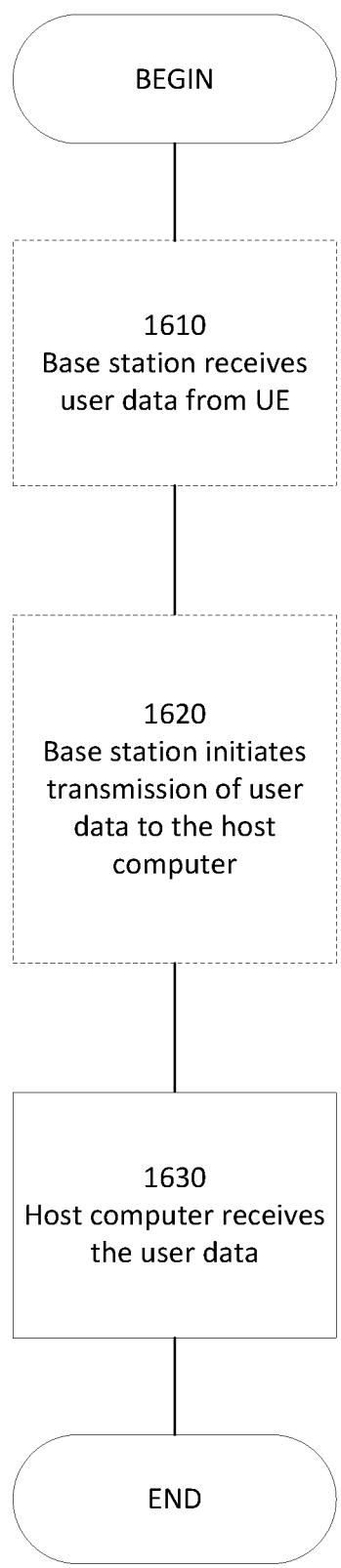
FIG. 16 is a flowchart illustrating a method implemented in a communication system, in accordance with one embodiment.

FIG. 16 is a flowchart illustrating a method implemented in a communication system, in accordance with one embodiment.

The communication system includes a host computer, a base station and a UE which may be those described with reference to FIGS. 11 and 12. For simplicity of the present disclosure, only drawing references to FIG. 16 will be included in this section. In an optional first step 1610 of the method, in accordance with the teachings of the embodiments described throughout this disclosure, the base station receives user data from the UE. In an optional second step 1620, the base station initiates transmission of the received user data to the host computer. In a third step 1630, the host computer receives the user data carried in the transmission initiated by the base station.

The following additional example embodiments are meant to be non-limiting, and can serve as an addendum to any other example embodiments, numbered embodiments, or example claims listed or otherwise described (explicitly or implicitly) throughout the present application and disclosure.

Embodiment A-1

A base station configured to communicate with a user equipment (UE), the base station comprising a radio interface and processing circuitry configured to perform aspects of example embodiments described throughout the present disclosure.

Embodiment A-2

A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform aspects of example embodiments described throughout the present disclosure, including aspects related to forwarding the user data to the UE.

Embodiment A-3

The communication system of embodiment A-2, further including the base station.

Embodiment A-4

The communication system of embodiment A-3, further including the UE, wherein the UE is configured to communicate with the base station.

Embodiment A-5

The communication system of embodiment A-4, wherein: the processing circuitry of the host computer is configured to execute a host application, thereby providing the user data; and the UE comprises processing circuitry configured to execute a client application associated with the host application.

Embodiment A-6

A method implemented in a base station, comprising aspects of example embodiments described throughout the present disclosure, including aspects related to transmitting user data to a UE.

Embodiment A-7

A method implemented in a communication system including a host computer, a base station and a user equipment (UE), the method comprising: at the host computer, providing user data; and at the host computer, initiating a transmission carrying the user data to the UE via a cellular network comprising the base station, wherein the base station is configured to perform aspects of example embodiments described throughout the present disclosure, included aspects related to transmitting the user data to the UE.

Embodiment A-8

The method of embodiment A-7, further comprising: at the base station, transmitting the user data.

Embodiment A-9

The method of embodiment A-8, wherein the user data is provided at the host computer by executing a host application, the method further comprising: at the UE, executing a client application associated with the host application.

Embodiment A-10

A user equipment (UE) configured to communicate with a base station, the UE comprising a radio interface and processing circuitry configured to perform aspects of example embodiments described throughout the present disclosure, including aspects related to receiving user data from the base station.

Embodiment A-11

A communication system including a host computer comprising: processing circuitry configured to provide user data; and a communication interface configured to forward user data to a cellular network for transmission to a user equipment (UE), wherein the UE comprises a radio interface and processing circuitry, the UE's processing circuitry configured to perform aspects of example embodiments described throughout the present disclosure, including aspects related to the UE receiving the user data from the base station.

Embodiment A-12

The communication system of embodiment A-11, further including the UE.

Embodiment A-13

The communication system of embodiment A-12, wherein the cellular network further includes a base station configured to communicate with the UE.

Embodiment A-14

The communication system of embodiment A-12 or A-13, wherein: the processing circuitry of the host computer is configured to execute a host application, thereby providing the user data; and the UE's processing circuitry is configured to execute a client application associated with the host application.

Embodiment A-15

A method implemented in a user equipment (UE), comprising aspects of example embodiments described throughout the present disclosure, including aspects related to the UE receiving user data from a base station.

Embodiment A-16

A method implemented in a communication system including a host computer, a base station and a user equipment (UE), the method comprising: at the host computer, providing user data; and at the host computer, initiating a transmission carrying the user data to the UE via a cellular network comprising the base station, wherein the UE is configured to perform aspects of example embodiments described throughout the present disclosure, including aspects related to the UE receiving the user data from the base station.

Embodiment A-17

The method of embodiment A-16, further comprising: at the UE, receiving the user data from the base station.

Embodiment A-18

A user equipment (UE) configured to communicate with a base station, the UE comprising a radio interface and processing circuitry configured to perform aspects of example embodiments described throughout the present disclosure, including aspects related to the UE transmitting user data to the base station.

Embodiment A-19

A communication system including a host computer comprising: a communication interface configured to receive user data originating from a transmission from a user equipment (UE) to a base station, wherein the UE comprises a radio interface and processing circuitry, the UE's processing circuitry configured to perform aspects of example embodiments described throughout the present disclosure, including aspects related to the UE transmitting user data to the base station.

Embodiment A-20

The communication system of embodiment A-19, further including the UE.

Embodiment A-21

The communication system of embodiment A-20, further including the base station, wherein the base station comprises a radio interface configured to communicate with the UE and a communication interface configured to forward to the host computer the user data carried by a transmission from the UE to the base station.

Embodiment A-22

The communication system of embodiment A-20 or A-21, wherein: the processing circuitry of the host computer is configured to execute a host application; and the UE's processing circuitry is configured to execute a client application associated with the host application, thereby providing the user data.

Embodiment A-23

The communication system of embodiment A-20 or A-21, wherein: the processing circuitry of the host computer is configured to execute a host application, thereby providing request data; and the UE's processing circuitry is configured to execute a client application associated with the host application, thereby providing the user data in response to the request data.

Embodiment A-24

A method implemented in a user equipment (UE), comprising aspects of example embodiments described throughout the present disclosure, including aspects related to the UE transmitting user data to a base station.

Embodiment A-25

The method of embodiment A-24, further comprising: providing user data; and forwarding the user data to a host computer via the transmission to the base station.

Embodiment A-26

A method implemented in a communication system including a host computer, a base station and a user equipment (UE), the method comprising: at the host computer, receiving user data transmitted to the base station from the UE, wherein the UE is configured to perform aspects of example embodiments described throughout the present disclosure, including aspects related to the UE transmitting user data to the base station.

Embodiment A-27

The method of embodiment A-26, further comprising: at the UE, providing the user data to the base station.

Embodiment A-28

The method of embodiment A-27, further comprising: at the UE, executing a client application, thereby providing the user data to be transmitted; and at the host computer, executing a host application associated with the client application.

Embodiment A-29

The method of embodiment A-27, further comprising: at the UE, executing a client application; and at the UE, receiving input data to the client application, the input data being provided at the host computer by executing a host application associated with the client application, wherein the user data to be transmitted is provided by the client application in response to the input data.

Embodiment A-30

A base station configured to communicate with a user equipment (UE), the base station comprising a radio interface and processing circuitry configured to perform aspects of example embodiments described throughout the present disclosure, including aspects related to the base station receiving user data from the UE.

Embodiment A-31

A communication system including a host computer comprising a communication interface configured to receive user data originating from a transmission from a user equipment (UE) to a base station, wherein the base station comprises a radio interface and processing circuitry, the base station's processing circuitry configured to perform aspects of example embodiments described throughout the present disclosure, including aspects related to the base station receiving user data from the UE.

Embodiment A-32

The communication system of embodiment A-31, further including the base station.

Embodiment A-33

The communication system of embodiment A-32, further including the UE, wherein the UE is configured to communicate with the base station.

Embodiment A-34

The communication system of embodiment A-33, wherein: the processing circuitry of the host computer is configured to execute a host application; the UE is configured to execute a client application associated with the host application, thereby providing the user data to be received by the host computer.

Embodiment A-35

A method implemented in a base station, comprising perform aspects of example embodiments described throughout the present disclosure, including aspects related to the base station receiving user data from a user equipment (UE).

Embodiment A-36

A method implemented in a communication system including a host computer, a base station and a user equipment (UE), the method comprising: at the host computer, receiving, from the base station, user data originating from a transmission which the base station has received from the UE, wherein one or both of the base station and the UE are configured to perform aspects of example embodiments described throughout the present disclosure, including aspects related to the base station receiving user data from the UE and/or aspects related to the UE transmitting user data to the base station.

Embodiment A-37

The method of embodiment A-36, further comprising: at the base station, receiving the user data from the UE.

Embodiment A-38

The method of embodiment A-37, further comprising: at the base station, initiating a transmission of the received user data to the host computer. Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a user equipment configured for use in a wireless communication system, the method comprising:
receiving from radio network equipment a command with respect to an operating configuration, the operating configuration specifying a set of transmission parameters for communication; and
confirming receipt of the command by setting the value of a confirmation field in a message and transmitting the message, wherein the confirmation field is shared for confirming receipt of a number of different types of commands with respect to the operating configuration that is greater than a number of possible values of the confirmation field.

2. The method of claim 1, wherein the command is either a first possible type which commands that a released operating configuration be activated, a second possible type which commands that an activated operating configuration be released, or a third possible type which commands that an activated operating configuration be re-activated with one or more different parameters, and wherein the confirmation field is shared for confirming receipt of any of the first, second, and third types of commands.

3. The method of claim 1, wherein the confirmation field is a single bit field, wherein the possible values of the confirmation field include a possible value of 1 and a possible value of 0.

4. The method of claim 1, wherein different possible values of the confirmation field are decoupled from the different possible types of commands, such that a certain value of the confirmation field does not confirm receipt of a certain type of command.

5. The method of claim 1, wherein different possible values of the confirmation field are decoupled from an activation status of the operating configuration, such that a certain value of the confirmation field does not indicate a certain activation status of the operating configuration.

6. A method performed by radio network equipment configured for use in a wireless communication system, the method comprising:
transmitting to a user equipment a command to with respect to an operating configuration, the operating configuration specifying a set of transmission parameters for communication;
after transmitting the command, receiving a message with a confirmation field; and
determining whether the message confirms receipt of the command based on the value of the confirmation field, wherein the confirmation field is shared for confirming receipt of a number of different types of commands with respect to the operating configuration that is greater than a number of possible values of the confirmation field.

7. The method of claim 6, wherein the command is either a first possible type which commands that a released operating configuration be activated, a second possible type which commands that an activated operating configuration be released, or a third possible type which commands that an activated operating configuration be re-activated with one or more different parameters, and wherein the confirmation field is shared for confirming receipt of any of the first, second, and third types of commands.

8. The method of claim 6, wherein the confirmation field is a single bit field, wherein the possible values of the confirmation field include a possible value of 1 and a possible value of 0.

9. The method of claim 6, wherein different possible values of the confirmation field are decoupled from the different possible types of commands, such that a certain value of the confirmation field does not confirm receipt of a certain type of command.

10. The method of claim 6, wherein different possible values of the confirmation field are decoupled from an activation status of the operating configuration, such that a certain value of the confirmation field does not indicate a certain activation status of the operating configuration.

11. A user equipment configured for use in a wireless communication system, the user equipment comprising:
communication circuitry; and
processing circuitry configured to:
receive from radio network equipment a command with respect to an operating configuration, the operating configuration specifying a set of transmission parameters for communication; and
confirm receipt of the command by setting the value of a confirmation field in a message and transmit the message, wherein the confirmation field is shared for confirming receipt of a number of different types of commands with respect to the operating configuration that is greater than a number of possible values of the confirmation field.

12. The user equipment of claim 11, wherein the command is either a first possible type which commands that a released operating configuration be activated, a second possible type which commands that an activated operating configuration be released, or a third possible type which commands that an activated operating configuration be re-activated with one or more different parameters, and wherein the confirmation field is shared for confirming receipt of any of the first, second, and third types of commands.

13. The user equipment of claim 11, wherein the confirmation field is a single bit field, wherein the possible values of the confirmation field include a possible value of 1 and a possible value of 0.

14. The user equipment of claim 11, wherein different possible values of the confirmation field are decoupled from the different possible types of commands, such that a certain value of the confirmation field does not confirm receipt of a certain type of command.

15. The user equipment of claim 11, wherein different possible values of the confirmation field are decoupled from an activation status of the operating configuration, such that a certain value of the confirmation field does not indicate a certain activation status of the operating configuration.

16. Radio network equipment configured for use in a wireless communication system, the radio network equipment comprising:
 communication circuitry; and
 processing circuitry configured to:
  transmit to a user equipment a command to with respect to an operating configuration, the operating configuration specifying a set of transmission parameters for communication;
  after transmitting the command, receive a message with a confirmation field; and
  determine whether the message confirms receipt of the command based on the value of the confirmation field, wherein the confirmation field is shared for confirming receipt of a number of different types of commands with respect to the operating configuration that is greater than a number of possible values of the confirmation field.

17. The radio network equipment of claim 16, wherein the command is either a first possible type which commands that a released operating configuration be activated, a second possible type which commands that an activated operating configuration be released, or a third possible type which commands that an activated operating configuration be re-activated with one or more different parameters, and wherein the confirmation field is shared for confirming receipt of any of the first, second, and third types of commands.

18. The radio network equipment of claim 16, wherein the confirmation field is a single bit field, wherein the possible values of the confirmation field include a possible value of 1 and a possible value of 0.

19. The radio network equipment of claim 16, wherein different possible values of the confirmation field are decoupled from the different possible types of commands, such that a certain value of the confirmation field does not confirm receipt of a certain type of command.

20. The radio network equipment of claim 16, wherein different possible values of the confirmation field are decoupled from an activation status of the operating configuration, such that a certain value of the confirmation field does not indicate a certain activation status of the operating configuration.

* * * * *